(12) United States Patent
Jiang et al.

(10) Patent No.: US 11,424,881 B2
(45) Date of Patent: Aug. 23, 2022

(54) METHOD AND DEVICE IN UE AND BASE STATION USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 175 days.

(21) Appl. No.: 16/889,784

(22) Filed: Jun. 1, 2020

(65) Prior Publication Data

US 2020/0295898 A1 Sep. 17, 2020

Related U.S. Application Data

(63) Continuation of application No. PCT/CN2017/115033, filed on Dec. 7, 2017.

(51) Int. Cl.
*H04W 4/00* (2018.01)
*H04L 5/00* (2006.01)
(Continued)

(52) U.S. Cl.
CPC .......... *H04L 5/0048* (2013.01); *H04W 24/10* (2013.01); *H04W 72/0453* (2013.01)

(58) Field of Classification Search
CPC .. H04L 5/0048; H04W 24/10; H04W 72/0453
(Continued)

(56) References Cited

U.S. PATENT DOCUMENTS 11,102,814 B2 * 8/2021 Bhorkar ............... H04L 5/0048
2013/0172002 A1 7/2013 Yu et al.
(Continued)

FOREIGN PATENT DOCUMENTS

| CN | 104796232 A | 7/2015 |
| CN | 106031073 A | 10/2016 |
| CN | 107113648 A | 8/2017 |

OTHER PUBLICATIONS

CMCC ("Further discussion on discovery signal design for LAA", R1-152030, Belgrade, Serbia, Apr. 20-24, 2015) (Year: 2015).*
ISR received in application No. PCT/CN2017/115033 dated Jul. 21, 2018.
Ericsson. "Discussion of Multi-Aoteana and Highly Directional Beam-FonniDg for Operation in Unlicensed Spectrum," 3GPP TSG-RAN WGI Meeting H91, R2-1720849,Dec. 1, 2017 (2017-124)1).

(Continued)

*Primary Examiner* — Maharishi V Khirodhar

(57) ABSTRACT

The present disclosure provides a method and a device in a User Equipment (UE) and a base station used for wireless communications. The UE receives Q1 indication information groups, which correspond to Q1 time slices respectively; then the UE receives Q2 reference signals respectively in Q2 time slices of a first frequency sub-band, and transmits first information; wherein a channel measurement for the Q2 reference signals is used to generate the first information. The present disclosure simplifies the process of channel detection on unlicensed spectrum by limiting the channel measurement for generating the first information in the Q2 time slices, and improves the flexibility of the base station to configure multiple reference signal combinations, so as to optimize the process of beam management on the unlicensed spectrum and improve the overall transmission efficiency and performance of the system.

16 Claims, 17 Drawing Sheets

(51) Int. Cl.
 H04W 24/10 (2009.01)
 H04W 72/04 (2009.01)
(58) Field of Classification Search
 USPC .......................................... 370/329
 See application file for complete search history.

(56) References Cited

U.S. PATENT DOCUMENTS

2016/0073366 A1* 3/2016 Ng .................. H04W 56/001
 370/329
2019/0075479 A1* 3/2019 Huang ................... H04L 5/005

OTHER PUBLICATIONS

刘建军等 (Liu, Juanjun et al.). " 非授权频段接入LAA技术进展及产业影响分析 (Non-official translation: UnLicense Assisted Access (LAA) Technology Progress and fadustrial fofluence Analysis)" 移动通信 (Mobile Communications), Aug. 31, 2015 (Aug. 31, 2015), pp. 136-141.
SR received in application No. 201780094865.0 dated May 28, 2022.
Office Action received in application No. 201780094865.0 dated Jun. 2, 2022.

* cited by examiner

METHOD AND DEVICE IN UE AND BASE STATION USED FOR WIRELESS COMMUNICATION

CROSS REFERENCE TO RELATED APPLICATIONS

This application is a continuation of International Application No. PCT/CN2017/115033, filed on Dec. 7, 2017, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In the traditional 3rd Generation Partner Project (3GPP) Long-term Evolution (LTE) system, data transmission can only occur on the licensed spectrum. However, with the rapid increase of traffic, especially in some urban areas, the licensed spectrum may not meet the demand of traffic. The communication on the unlicensed spectrum in Release 13 and Release 14 is introduced by the cellular system and is used for the transmission of downlink and uplink data. To ensure compatibility with other access technologies on unlicensed spectrum, Listen Before Talk (LBT) technology is adopted by Licensed Assisted Access (LAA) to avoid interference caused by multiple transmitters occupying the same frequency resources at the same time.

At present, the technical discussion on 5G New Radio Access Technology (NR) is in progress, among which massive Multi-Input Multi-Output (MIMO) becomes a research hotspot of the next generation mobile communication. In massive MIMO, multiple antennas form beams pointing to a specific spatial direction through beamforming to improve the communication quality. When considering the coverage characteristics brought by beamforming, the traditional LBT scheme in LAA needs to be reconsidered.

SUMMARY

When beamforming is applied to wireless transmission, the general practice is that the base station will first configure multiple reference signals for multiple beams for the User Equipment (UE), and then the UE will conduct a channel measurement for multiple reference signals to obtain the best beam, and transmit the measurement result to the base station to improve transmission performance. In the LAA discussion of Release-13 and Release-14, considering the uncertainty of channel occupancy and the uncertainty of base station transmission power, the UE will only assume that the Cell Reference Signal (CRS) in a DL Burst and Channel State Information Reference Signal (CSI-RS) have the same transmission power, so the UE will not generate a result for the measurement of CRS or CSI-RS between different DL Bursts. In 5G system, beamforming will be used on a large scale, and the measurement of multiple beams will bring more LBT process, and thus bring uncertainty and large delay to measurement.

In view of the above problems, the present disclosure provides a solution. It should be noted that the embodiments of a UE in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a UE for wireless communication, comprising:

receiving Q1 indication information groups, which correspond to Q1 time slices respectively, the Q1 being a positive integer;

receiving Q2 reference signals respectively in Q2 time slices of the first frequency sub-band;

transmitting first information;

wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; The Q1 indication information groups, the Q2 reference signals and the first information are all transmitted through an air interface.

In one embodiment, the above method is advantageous in that the first information only includes the measurement result of the Q2 reference signals, so that the base station can flexibly configure the Q2 reference signals for the UE to configure the antenna port needed to be measured, thus improving the flexibility and efficiency of measurement for different beams in LAA scenario.

In one embodiment, the above method is also advantageous in that the Q2 reference signals are located in the Q2 time slices. When the base station ensures that the transmission power of each of the Q2 reference signals is known to the UE, the UE averages the measurement results on the Q2 time slices to improve the accuracy of the measurement.

According to one aspect of the present disclosure, the above method is characterized in comprising:

receiving second information;

wherein the second information is used to determine a first index set, the first index set comprises a positive integer number of index(es), and the Q1 indication information groups are used to determine Q1 indexes respectively; the Q2 indication information groups among the Q1 indication information groups correspond to the Q2 time slices one by one, and the Q2 indexes corresponding to the Q2 indication information groups belong to the first index set; the second information is transmitted through an air interface.

In one embodiment, the above method is characterized in that the second information groups the Q1 time slices, and a channel measurement in time slices belonging to a same group (i.e., the first index set) is reported to the base station via the first information.

In one embodiment, the above method is advantageous in that the base station groups beams maintained by itself, and the beams belonging to the same group will be measured and reported at the same time, so as to make full use of time slices passed by LBT for measurement, and improve the flexibility of base station's beam configuration.

In one embodiment, the above method is also advantageous in that the Q2 time slices respectively correspond to Q2 analog beams, and the base station only needs one LBT under one analog beam, so as to reduce the frequency of LBT, and improving a number of times of and efficiency of measurement per unit time.

According to one aspect of the present disclosure, the above method is characterized in comprising:

receiving third information;

wherein a given reference signal is any reference signal in the Q2 reference signals, and the third information is used to determine at least the former between frequency domain resources occupied by the given reference signal and a period configured by the given reference signal; the third information is transmitted through an air interface.

In one embodiment, the above method is characterized in that the third information is used to configure a reference signal of the first information reference.

According to one aspect of the present disclosure, the above method is characterized in comprising:

receiving a first radio signal;

wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belong(s) to antenna ports comprised in the Q2 antenna port groups; the UE receives the first radio signal in the candidate antenna port set; the M is a positive integer.

In one embodiment, the above method is characterized in that the UE recommends a beamforming vector to the base station through the first information, and uses the recommended beamforming vector for reception.

According to one aspect of the present disclosure, the above method is characterized in that a given indication information group is any of the Q1 indication information groups, the given indication information group comprises N piece(s) of indication information, the N piece(s) of indication information respectively indicate(s) that N multi-carrier symbol group(s) is(are) occupied, and any of the N multi-carrier symbol group(s) comprise(s) a positive integer number of multi-carrier symbol(s).

The present disclosure provides a method in a base station for wireless communication, comprising:

transmitting Q1 indication information groups, which correspond to Q1 time slices respectively, the Q1 being a positive integer;

transmitting Q2 reference signals respectively in Q2 time slices of a first frequency sub-band;

receiving first information;

wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups includes a positive integer number of piece(s) of indication information, and all the indication information included in the Q1 indication information groups is dynamically configured; the Q1 indication information groups, the Q2 reference signals and the first information are all transmitted through an air interface.

According to one aspect of the present disclosure, the above method is characterized in comprising:

transmitting second information;

wherein the second information is used to determine a first index set, the first index set comprises a positive integer number of index(es), and the Q1 indication information groups are respectively used to determine Q1 indexes; the Q2 indication information groups among the Q1 indication information groups correspond to the Q2 time slices one by one, and Q2 indexes corresponding to the Q2 indication information groups belong to the first index set; the second information is transmitted through an air interface.

According to one aspect of the present disclosure, the above method is characterized in comprising:

transmitting third information;

wherein a given reference signal is any reference signal among the Q2 reference signals, and the third information is used to determine at least the former between frequency domain resources occupied by the given reference signal and a period configured by the given reference signal; the third information is transmitted through an air interface.

According to one aspect of the present disclosure, the above method is characterized in comprising:

transmitting a first radio signal;

wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna ports belongs to the antenna ports comprised in the Q2 antenna port groups; the base station transmits the first radio signal in the candidate antenna port set; the M is a positive integer.

According to one aspect of the present disclosure, the above method is characterized in that the given indication information group is any of the Q1 indication information groups, the given indication information group comprises N piece(s) of indication information, the N piece(s) of indication information respectively indicates that N multi-carrier symbol group(s) is(are) occupied, and any of the N multi-carrier symbol group(s) comprises a positive integer number of multi-carrier symbol(s).

According to one aspect of the present disclosure, the above method is characterized in comprising:

performing Q1 energy detections in Q1 time intervals;

wherein the Q1 time intervals correspond to the Q1 time slices respectively, and the base station determines that the first frequency sub-band is idle in the Q1 time slices through the Q1 energy detections.

The present disclosure provides a UE for wireless communication, comprising:

a first receiver, receiving Q1 indication information groups, which correspond to Q1 time slices respectively, the Q1 being a positive integer;

a second receiver, receiving Q2 reference signals in Q2 time slices of a first frequency sub-band;

a first transceiver, transmitting first information;

wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; the Q1 indication information groups, the Q2 reference signals and the first information are all transmitted through an air interface.

In one embodiment, the above UE for wireless communication is characterized in that the first receiver further receives a second information; the second information is used to determine a first index set, the first index set comprises a positive integer number of index(es), and the Q1 indication information groups are used to determine Q1 indexes respectively; the Q2 indication information groups among the Q1 indication information groups correspond to the Q2 time slices one by one, and the Q2 indexes corresponding to the Q2 indication information groups belong to the first index set; the second information is transmitted through an air interface.

In one embodiment, the above UE for wireless communication is characterized in that the first receiver further receives third information; wherein a given reference signal is any reference signal among the Q2 reference signals, and the third information is used to determine at least the former between frequency domain resources occupied by the given reference signal and a period configured by the given reference signal; the third information is transmitted through an air interface.

In one embodiment, the above UE for wireless communication is characterized in that the first transceiver further receives a first radio signal; wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to antenna ports comprised in the Q2 antenna port groups; the UE receives the first radio signal in the candidate antenna port set; the M is a positive integer.

In one embodiment, the above UE for wireless communication is characterized in that the given indication information group is any of the Q1 indication information groups, and the given indication information group comprises N piece(s) of instruction information, the N piece(s) of indication information respectively indicates that N multi-carrier symbol groups are occupied, and any of the N multi-carrier symbol groups comprises a positive integer number of multi-carrier symbol(s).

The present disclosure provides a base station for wireless communication, comprising:

a second transceiver, transmitting Q1 indication information groups, and the Q1 indication information groups respectively correspond to Q1 time slices, the Q1 being a positive integer;

a first transmitter, transmitting Q2 reference signals respectively in Q2 time slices of a first frequency sub-band;

a third transceiver, receiving first information;

wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; the Q1 indication information groups, the Q2 reference signals and the first information are all transmitted through an air interface.

In one embodiment, the above UE for wireless communication is characterized in that the second transceiver further transmits second information; the second information is used to determine a first index set, the first index set comprises a positive integer number of index(es), and the Q1 indication information groups are used to determine Q1 indexes respectively; Q2 indication information groups in the Q1 indication information groups correspond to the Q2 time slices one by one, and Q2 indexes corresponding to the Q2 indication information groups belong to the first index set; the second information is transmitted through an air interface.

In one embodiment, the above UE for wireless communication is characterized in that the second transceiver further transmits third information; the given reference signal is any of the Q2 reference signals, and the third information is used to determine at least the former between frequency domain resources occupied by the given reference signal and a period configured by the given reference signal; the third information is transmitted through an air interface.

In one embodiment, the above UE for wireless communication is characterized in that the third transceiver further transmits a first radio signal; wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port belongs to the antenna ports comprised in the Q2 antenna port groups; the base station transmits the first radio signal in the candidate antenna port set; the M is a positive integer.

In one embodiment, the above base station for wireless communication is characterized in that the given indication information group is any of the Q1 indication information groups, and the given indication information group comprises N piece(s) of instruction Information, the N piece(s) of indication information respectively indicates that N multi-carrier symbol groups are occupied, and any of the N multi-carrier symbol groups comprises a positive integer number of multi-carrier symbol(s).

In one embodiment, the above base station for wireless communication is characterized in that the second transceiver further performs Q1 energy detections in Q1 time intervals; the Q1 time intervals respectively correspond to the Q1 time slices, and the base station determines that the first frequency sub-band is idle in the Q1 time slices through the Q1 energy detections.

In one embodiment, the present disclosure has the following advantages over conventional schemes:

the first information only includes the measurement result of the Q2 reference signals, so that the base station can flexibly configure the Q2 reference signals to configure antenna ports that need to be measured for the UE, thus improving the flexibility and efficiency of measurement for different beams in LAA scenario;

the Q2 reference signals are located in the Q2 time slices, when the base station ensures that the transmission power of each of the Q2 reference signals is known to the UE, the UE averages the measurement result on the Q2 time slices to improve the measurement accuracy;

the base station groups the beams maintained by itself through the second information, the beams belonging to the same group will be measured and reported at the same time, so as to make full use of the time slices passed by LBT for measurement and improve the flexibility of beam configuration of the base station.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
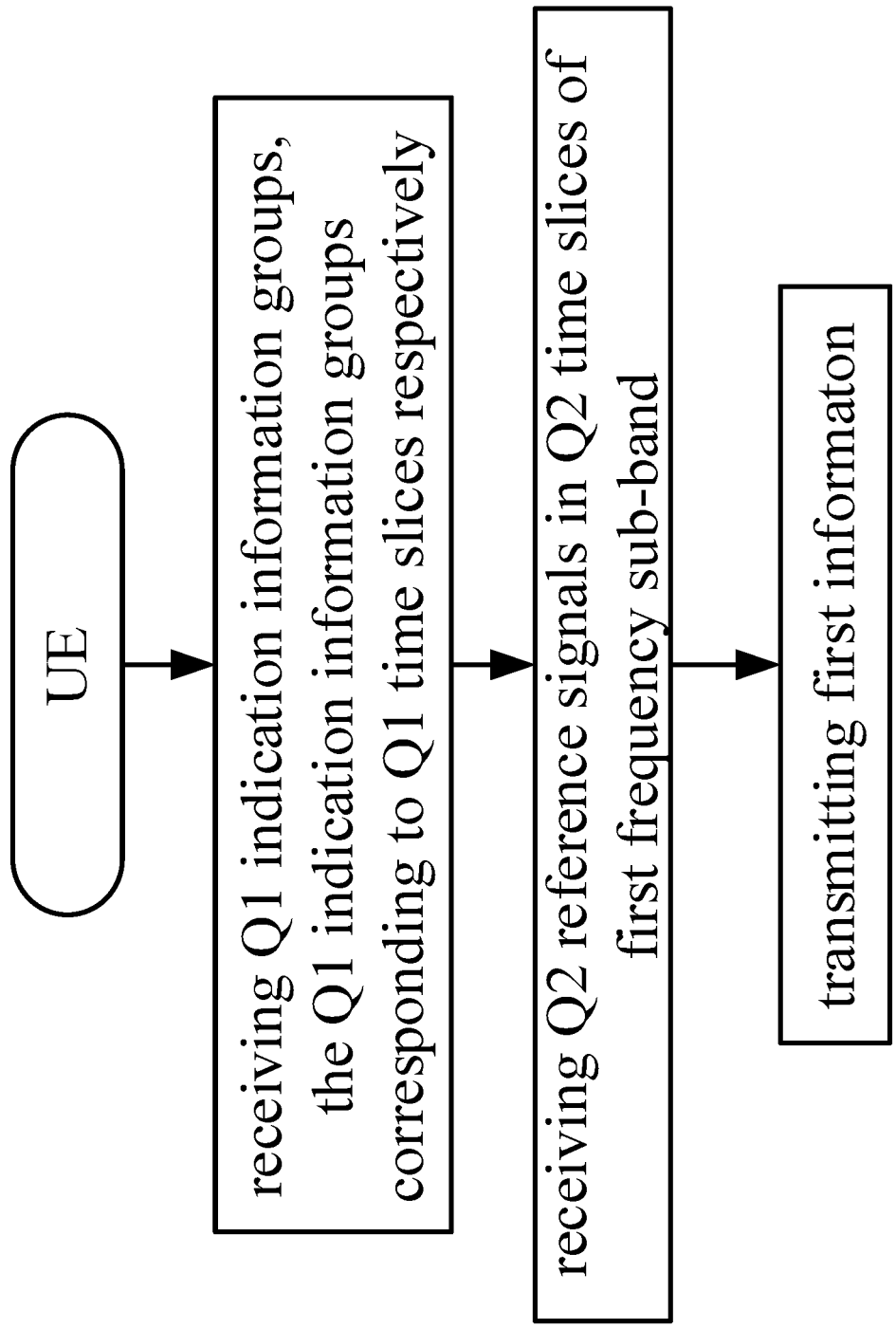
FIG. 1 illustrates a flowchart of first information according to one embodiment of the present disclosure.

Embodiment 1 illustrates a flowchart of a first information, as shown in FIG. 1.

In Embodiment 1, the UE in the disclosure firstly receives Q1 indication information groups, which correspond to Q1 time slices, and the Q1 is a positive integer; then Q2 reference signals are received in Q2 time slices of a first frequency sub-band; and a first message is transmitted; wherein a channel measurement for the Q2 reference signals is used to generate the first information, and the channel measurement used to generate the first information is limited to the Q2 time slices of the Q1 time slices, and the Q2 is a positive integer not bigger than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all indication information comprised in the Q1 indication information groups is dynamically configured; the Q1 indication information groups, the Q2 reference signals and the first information are all transmitted through an air interface.

In one subembodiment, the Q1 time slices are orthogonal in time domain.

In one subembodiment, the first information comprises Channel State Information (CSI).

In one subembodiment, the first information comprises a Channel Quality Indicator (CQI).

In one subsidiary embodiment of the subembodiment, the phrase that the channel measurement for the Q2 reference signals is used to generate the first information refers to: the UE determines downlink-channel-quality-related information according to at least one of the Q2 reference signals, and the UE recommends to the base station the maximum Modulation and Coding Scheme (MCS) used by the base station for downlink transmission through the first information based on the downlink channel quality information.

In one subembodiment, the first information comprises Precoding Matrix Indicators (PMI).

In one subsidiary embodiment of the subembodiment, the phrase that the channel measurement for the Q2 reference signals is used to generate the first information refers to: the UE determines downlink-channel-quality-related information according to at least one of the Q2 reference signals, and the UE recommends to the base station the pre-coding matrix used by the base station for downlink transmission through the first information based on the downlink channel quality information.

In one subembodiment, the first information comprises RI.

In one subsidiary embodiment of the subembodiment, the phrase that the channel measurement for the Q2 reference signals is used to generate the first information refers to: the UE determines downlink-channel-quality-related information according to at least one of the Q2 reference signals, and the UE recommends to the base station the Layer Number used by the base station for downlink transmission through the first information based on the downlink channel quality information.

In one subembodiment, the first information comprises Channel State Information Resource Indication (CRI).

In one subsidiary embodiment of the subembodiment, the phrase that the channel measurement for the Q2 reference signals is used to generate the first information refers to: the Q2 reference signals are transmitted respectively by the Q2 antenna port groups, any of the Q2 antenna port groups comprises a positive integer number of antenna port(s). The first information is used to determine a candidate antenna port set, and the antenna ports comprised in the candidate antenna port set belong to all the antenna ports comprised in the Q2 antenna port groups.

In one example of the subsidiary embodiment, the candidate antenna port set comprises Q3 antenna port(s), the Q2 antenna port groups comprise Q4 antenna ports in total, and the downlink channel quality(qualities) corresponding to the Q3 antenna port(s) is(are) the best Q3 of downlink channel quality(qualities) corresponding to the Q4 antenna ports; Q3 is a positive integer less than Q4, and Q4 is a positive integer not less than Q2.

In one example of the subsidiary embodiment, the candidate antenna port set only comprises one antenna port.

In one example of the subsidiary embodiment, each of the antenna ports comprised in the candidate antenna port set belongs to one of the Q2 antenna port groups.

In one subembodiment, the phrase that the channel measurement for the Q2 reference signals is used to generate the first information refers to: the Q2 reference signals are respectively transmitted by Q2 antenna port groups, the given antenna port group is one of the Q2 antenna port groups, the downlink radio signal received by the UE on the given antenna port group is the best one among the downlink radio signals received by the Q2 antenna port groups. The UE determines the given antenna port group through the first information.

In one subembodiment, the phrase that the channel measurement used to generate the first information is limited to the Q2 time slices of the Q1 time slices refers to: the result of the downlink measurement in the Q1 time slices and outside the Q2 time slices are not used to determine the first information.

In one subembodiment, the phrase that the channel measurement used to generate the first information is limited to the Q2 time slices of the Q1 time slices refers to: the UE determines the first information only according to the result of downlink measurement of the Q2 time slices.

In one subembodiment, the phrase that the channel measurement used to generate the first information is limited to the Q2 time slices of the Q1 time slices refers to: time slices in the Q1 time slices and outside the Q2 time slices correspond to (Q1-Q2) candidate reference signal(s), and the determination of the first information is independent of the channel measurement result for the (Q1-Q2) candidate reference signal(s).

In one subembodiment, the unoccupied multi-carrier symbol refers to: the transmitter of the Q1 indication information groups does not transmit a radio signal on the unoccupied multi-carrier symbol.

In one subembodiment, the unoccupied multi-carrier symbol refers to: the UE does not transmit radio signals on the unoccupied multi-carrier symbol.

In one subembodiment, one of the time slices in the disclosure comprises a positive integer number of multi-carrier symbol(s), and each of the positive integer number of multi-carrier symbol(s) comprised in a time slice is multi-carrier symbols other than the unoccupied multi-carrier symbols.

In one subsidiary embodiment of the subembodiment, each of a positive integer number of multi-carrier symbol(s) comprised in one time slice is occupied.

In one subembodiment, any of the Q1 time slices does not comprise an unoccupied multi-carrier symbol.

In one subembodiment, the Q1 is greater than Q2.

In one subembodiment, the Q1 indication information groups are respectively used to determine whether the Q1 time slices comprise a target Reference Signal (RS).

In one subembodiment, the Q2 time slices are the latest time slices comprising target RS among the Q1 time slices.

In one subembodiment, the Q2 time slices are the latest time slices comprising target RS and a number of multi-carrier symbols comprised is not less than a given threshold, and the given threshold is a positive integer.

In one subsidiary embodiment of the subembodiment, the given threshold value is 14.

In one subembodiment, the pattern of the target RS in a Physical Resource Block (PRB) (i.e. the position of occupied Resource Element (RE) and the pattern of CSI-RS (Channel State Information Reference Signal) in a PRB are the same.

In one subembodiment, the target RS in the present disclosure is CSI-RS.

In one subembodiment, the target RS in the present disclosure is Synchronization Sequence (SS).

In one subembodiment, the target RS in the present disclosure is Demodulation Reference Signal (DMRS).

In one subembodiment, the first frequency sub-band is a Carrier.

In one subembodiment, the first frequency sub-band is a Bandwidth Part (BWP).

In one subembodiment, the first frequency sub-band is deployed on the unlicensed spectrum.

In one subembodiment, the first frequency sub-band occupies frequency domain resource corresponding to a positive integer number of continuous Physical Resource Block(s) (PRB) in frequency domain.

In one subembodiment, the first frequency sub-band occupies frequency domain resource corresponding to a positive integer number of sub-carrier(s) in frequency domain.

In one subsidiary embodiment of the subembodiment, the positive integer number of subcarrier(s) is(are) continuous in frequency domain.

In one subembodiment, the multi-carrier symbol is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol comprising Cyclic Prefix (CP), or a Discrete Fourier Transform Spreading Orthogonal Frequency Division Multiplexing (DFT-s-OFDM) symbol comprising CP.

In one subembodiment, the Q2 reference signals are respectively transmitted by Q2 antenna port groups.

In one subsidiary embodiment of the subembodiment, any reference signal of the Q2 reference signals comprises a positive integer number of reference sub-signal(s), and any of the positive integer number of reference sub-signal(s) is transmitted by an antenna port.

In one subsidiary embodiment of the subembodiment, the reference sub-signal is a CSI-RS transmitted by an antenna port.

In one subsidiary embodiment of the subembodiment, the reference sub-signal is SS transmitted by an antenna port.

In one subsidiary embodiment of the subembodiment, the pattern of the reference sub-signal in one PRB (i.e. the position of occupied RE) is the same as that of CSI-RS in one PRB.

In one subsidiary embodiment of the subembodiment, the pattern of the reference sub-signal in a PRB (i.e., the position of the occupied RE) is the same as the pattern of the RE corresponding to a CSI-RS index in a PRB.

In one sub-embodiment, the value of the Q1 is fixed, or the value of the Q1 is configured through Radio Resource Control (RRC) signaling.

In one subembodiment, the value of Q2 is fixed, or the value of Q2 is configured through RRC signaling.

In one subembodiment, the air interface is wireless.

In one subembodiment, the air interface comprises a wireless channel.

In one subembodiment, the air interface is an interface between the base station and the UE.

In one subembodiment, the air interface is a Uu interface.

Figure 2:
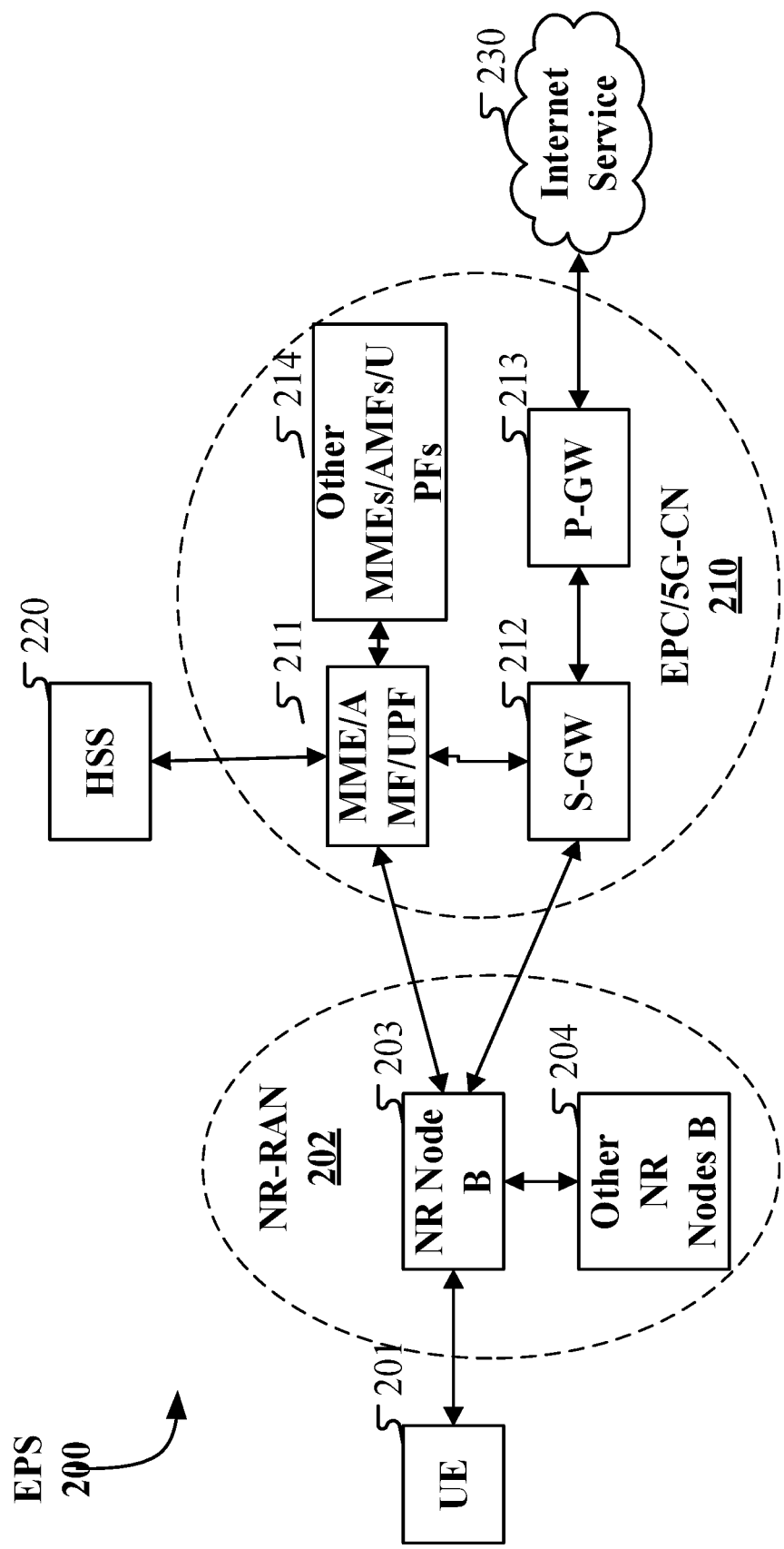
FIG. 2 illustrates a schematic diagram of a network architecture according to one embodiment of the present disclosure.

In one subembodiment, the air interface corresponds to the interface between UE201 and NR Node B203 in FIG. 2.

In one subembodiment, the transmission channel corresponding to the first information is an Uplink Shared Channel (UL-SCH).

In one subembodiment, the first information belongs to Uplink Control Information (UCI).

In one subembodiment, the physical channel corresponding to the first information is a Physical Uplink Control Channel (PUCCH).

Embodiment 2

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 illustrates the network architecture 200 of NR 5G, Long-Term Evolution (LTE) and Long-Term Evolution Advanced (LTE-A). NR 5G or LTE network architecture 200 can be referred as Evolved Packet System (EPS) 200 or some other applicable terms. EPS200 may comprises one or more UE 201, Next Generation Radio Access Network (NG-RAN) 202, Evolved Packet Core (EPC)/5G-Core Network (5G-CN) 210, Home Subscriber Server (HSS) 220 and Internet Service 230. EPS can be interconnected with other access networks, but these entities/interfaces are not shown for simplicity. As shown in the figure, EPS provides packet switching services, while those skilled in the art will easily understand that the various concepts presented throughout this disclosure can be extended to networks providing circuit switched services or other cellular networks. NG-RAN includes NR node B (gNB)203 and other gNB204. GNB203 provides user and control plane protocol termination for UE201. The gNB203 may be connected to other gNB204 via an Xn interface (e.g., return). The gNB203 may also be called a base station, a base transceiver, a radio base station, a radio transceiver, a transceiver function, a Base Service Set (BSS), an Extended Service Set (ESS), a Transmitter Receiver Point (TRP), or some other applicable terms. GNB203 provides access point for UE201 to EEPC/5G-CN210. Examples of UE201 include cellular phones, smart phones, Session Initiation Protocol (SIP) phones, laptop computers, Personal Digital Assistant (PDA), Satellite Radios, non-ground base station communication, satellite mobile communication, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB203 is connected to EPC/5G-CN210 through S1/NG interface. EPC/5G-CN210 comprises an MME/AMF/UPF211, other Mobility Management Entities (MME)/Authentication Management Field (AMF)/a User Plane Function (UPF)214, a Service Gateway (S-GW) 212 and a Packet Date Network Gateway (P-GW)213. The MME/AMF/UPF211 is a control node that processes signaling between the UE201 and the EPC/5G-CN210. In general, the MME/AMF/UPF211 provides bearing and connection management. All user internet protocol (IP) packets are transmitted through S-GW212, which itself connects to a P-GW213. The P-GW213 provides UE IP address assignment and other functions. The P-GW213 connects to a Internet service 230. The Internet service 230 comprises the IP services corresponding to operators, specifically including Internet, intranet, IP Multimedia Subsystem (IMS) and PS streaming services (PSS).

In one embodiment, the UE201 corresponds to the UE in the present disclosure.

In one embodiment, the gNB203 corresponds to the base station in the present disclosure.

In one subembodiment, the UE201 supports wireless communication for data transmission over an unlicensed spectrum.

In one subembodiment, the gNB203 supports wireless communication for data transmission over unlicensed spectrum.

In one subembodiment, the UE201 supports massive MIMO wireless communication.

In one subembodiment, the gNB203 supports massive MIMO wireless communication.

Embodiment 3

Figure 3:
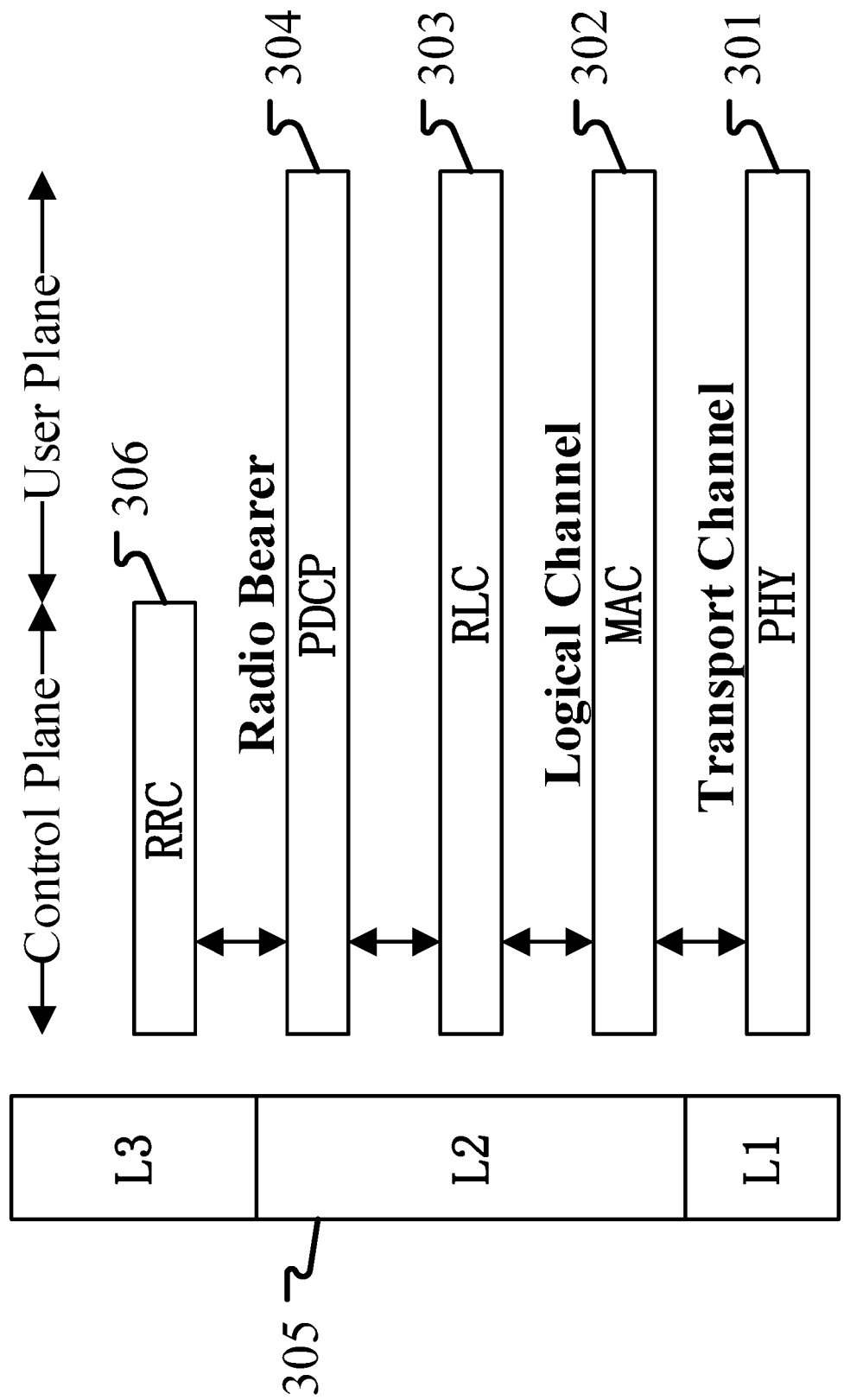
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating an embodiment of a radio protocol architecture for a user plane and a control plane. FIG. 3 illustrates a radio protocol architecture for a UE and a base station (gNB or eNB) in three layers: Layer 1, 2 and 3. Layer 1 (L1) is the lowest layer and implements various physical layer (PHY) signal processing functions. Layer L1 will be called PHY301 in this article. 305, Layer 2 (L2) is above PHY301 and is responsible for the link between UE and gNB through PHY301. In the user plane, 305, L2 comprises Medium Access Control (MAC) sublayer 302, Radio Link Control (RLC) sublayer 303 and Packet Data Convergence Protocol (PDCP) sublayer 304, which terminate at the gNB on the network side. Although not shown in the figure, UE may have several upper layers above 305, L2, comprising a network layer (e.g., IP layer) terminating at P-GW on the network layer and an application layer terminating at the other end of the connection (e.g., remote UE, server, etc.). PDCP sublayer 304 provides multiplexing between different radio carriers and logical channels. PDCP sublayer 304 also provides header compression for upper layer packets to reduce radio transmission overhead, provides security by encrypting packets, and provides region-cross transition support for UE between gNBs. RLC sublayer 303 provides segmentation and reassembling of upper layer data packets, retransmission of lost data packets, and reordering of data packets to compensate for disorder reception caused by HARQ. MAC sublayer 302 provides multiplexing between logic and transmission channels. MAC sublayer 302 is also responsible for allocating various radio resources (e.g., resource blocks) in a cell between UEs. MAC sublayer 302 is also responsible for HARQ operations. In the control plane, the radio protocol architecture for UE and gNB is substantially the same for physical layer 301 and 305, L2, but there is no header compression function for control plane. The control plane also comprises the Radio Resource Control (RRC) sublayer 306 in layer 3 (L3). The RRC sublayer 306 is responsible for obtaining radio resources (i.e., radio bearer) and configuring the lower layer with RRC signaling between a gNB and a UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the Q1 indication information groups in the present disclosure is generated by the PHY 301.

In one subembodiment, the first information in the present disclosure is generated by the PHY 301.

In one subembodiment, the first information in the present disclosure is generated by the MAC sublayer 302.

In one subembodiment, the second information in the present disclosure is generated by the RRC sublayer 306.

In one subembodiment, the third information in the present disclosure is generated by the RRC sublayer 306.

Embodiment 4

Figure 4:
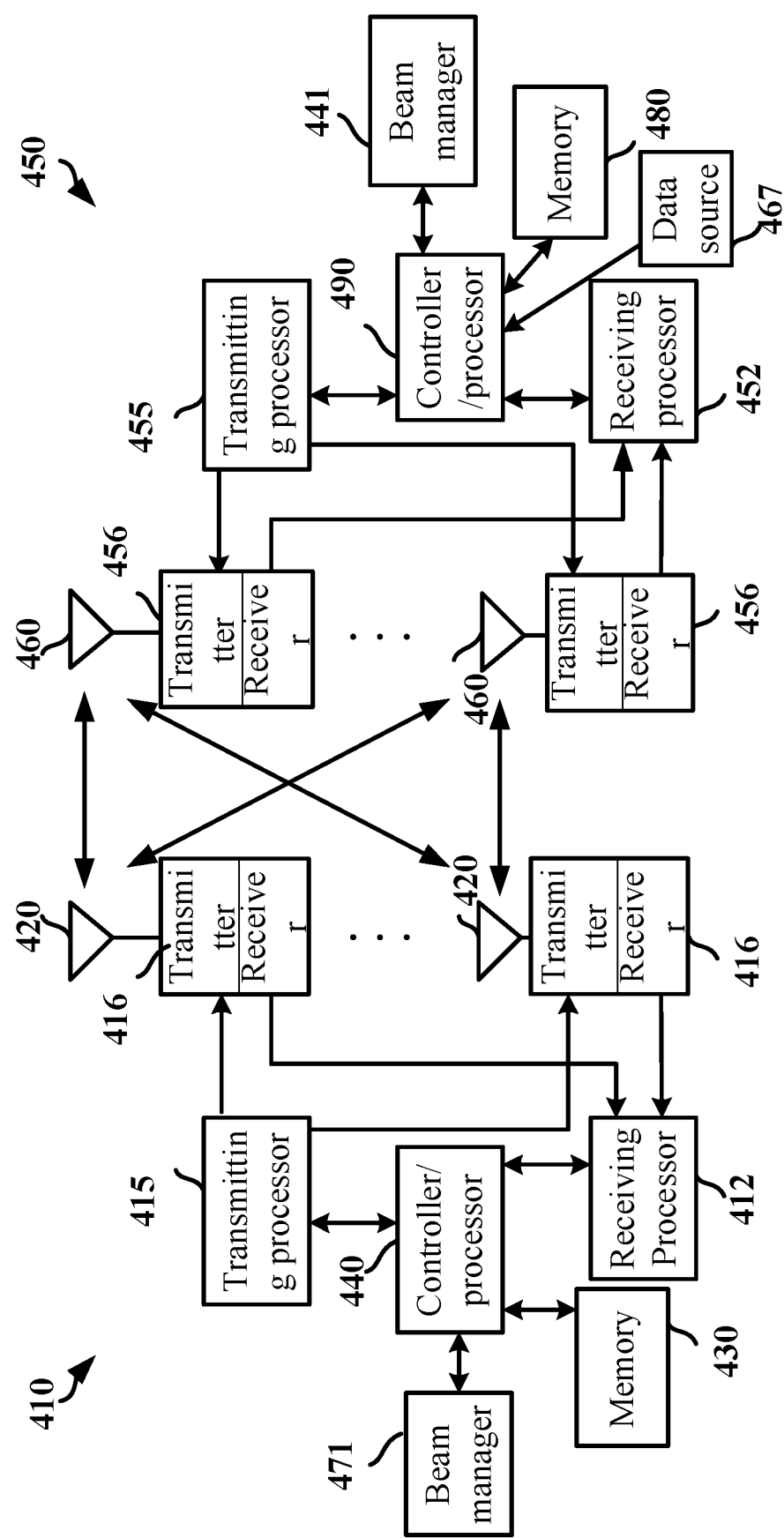
FIG. 4 illustrates a schematic diagram of an evolution node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a transmitting processor 415, a beam manager 471, a transmitter/receiver 416 and an antenna 420.

The UE (450) comprises a controller/processor 490, a memory 480, a data source 467, a transmitting processor 455, a receiving processor 452, a beam manager 441, a transmitter/receiver 456 and an antenna 460.

In downlink (DL) transmission, processes relevant to the base station (410) include the following:

a higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; the higher layer packet may comprise data or control information, such as a Downlink Shared Channel (DL-SCH);

the controller/processor 440 is connected to the memory 430 that stores program codes and data, the memory 430 may be called a computer readable medium;

the controller/processor 440 comprises scheduling units for transmission requests, the scheduling units are used for scheduling radio resources corresponding to transmission requests;

the beam processor 471 determines Q1 indication information groups, second information and third information;

the transmitting processor 415 receives a bit stream output from the controller/processor 440, and performs signal transmitting processing functions of the L1 layer (i.e., PHY), including coding, interleaving, scrambling, modulation, power control/allocation and generation of physical layer control signaling (such as PBCH, PDCCH, PHICH, PCFICH, reference signal), etc.;

the transmitter 416 is configured to convert the baseband signal provided by the transmitting processor 415 into a radio frequency signal to be transmitted via the antenna 420; each transmitter 416 performs sampling processing on respective input symbol streams to obtain respective sampled signal streams. Each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

the receiver 456 is configured to convert the radio frequency signal received by the antenna 460 into a baseband signal and provide the baseband signal to the receiving processor 452;

the receiving processor 452 performs various signal receiving processing functions for the L1 layer (i.e., PHY), including decoding, deinterleaving, descrambling, demodulation and extraction of physical layer control signaling;

Controller/processor 490, determining the first signaling, and the second signaling;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the beam processor 441 determines Q1 indication information groups, second information and third information;

the controller/processor 490 is connected to the memory 480 that stores program codes and data. The memory 480 may be called a computer readable medium.

In one subembodiment, the UE450 comprises at least one processor and one memory. The at least one memory comprises computer program codes; the at least one memory and the computer program codes are configured to be used in collaboration with the at least one processor. The UE450 at least receives Q1 indication information groups, which respectively correspond to Q1 time slices, the Q1 being a positive integer; receives Q2 reference signals respectively in Q2 time slices of a first frequency sub-band; and transmits first information; wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all indication information comprised in the Q1 indication information groups is dynamically configured; The Q1 indication information groups, the Q2 reference signals and the first information are all transmitted through an air interface.

In one subembodiment, the UE450 comprises a memory that stores a computer readable instruction program. The computer readable instruction program generates an action when executed by at least one processor, including: receiving Q1 indication information groups, which correspond to Q1 time slices respectively, the Q1 being a positive integer; receiving Q2 reference signals respectively in Q2 time slices of a first frequency sub-band; and transmitting first information; wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all indication information comprised in the Q1 indication information groups is dynamically configured; the Q1 indication information groups, the Q2 reference signals and the first information are all transmitted through an air interface.

In one subembodiment, the gNB410 comprises at least one processor and at least one memory. The at least one memory comprises computer program codes; the at least one memory and the computer program codes are configured to be used in collaboration with the at least one processor. The gNB410 at least transmits Q1 indication information groups, which corresponds to Q1 time slices respectively, and Q1 being a positive integer; transmits Q2 reference signals respectively in Q2 time slices of a first frequency sub-band; and receives first information; wherein a channel measurement for the Q2 reference signals is used to generate the first information, and the channel measurement used to generate the first information is limited to the Q2 time slices of the Q1 time slices, and the Q2 is a positive integer not bigger than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all indication information comprised in the Q1 indication information groups is dynamically configured; the Q1 indication information groups, the Q2 reference signals and the first information are all transmitted through an air interface.

In one subembodiment, the gNB410 comprises a memory that stores a computer readable instruction program. The computer readable instruction program generates an action when executed by at least one processor, including: transmitting Q1 indication information groups, which respectively corresponds to Q1 time slices, and Q1 is a positive integer; transmitting Q2 reference signals respectively in Q2 time slices of a first frequency sub-band; and receiving first information; wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of indication information, and all indication information comprised in the Q1 indication information groups is dynamically configured; the Q1 indication information groups, the Q2 reference signals and the first information are all transmitted through an air interface.

In one subembodiment, the UE450 corresponds to the UE in the present disclosure.

In one subembodiment, the gNB410 corresponds to the base station in the present disclosure.

In one subembodiment, at least the first two of the receiver 456, the receiving processor 452, and the controller/processor 490 are used to receive Q1 indication information groups, and the Q1 indication information groups correspond to Q1 time slices respectively.

In one subembodiment, at least the first two of the receiver 456, the receiving processor 452, and the controller/processor 490 are used to receive Q2 reference signals in Q2 time slices of the first frequency sub-band respectively.

In one subembodiment, at least the first two of the transmitter 456, the transmitting processor 455 and the controller/processor 490 are used to transmit the first information.

In one subembodiment, at least the first two of the receiver 456, the receiving processor 452 and the controller/processor 490 are used for receiving second information.

In one subembodiment, at least the first two of the receiver 456, the receiving processor 452 and the controller/processor 490 are used for receiving third information.

In one subembodiment, at least the first two of the receiver 456, the receiving processor 452 and the controller/processor 490 are used for receiving a first radio signal.

In one subembodiment, at least the former of beam manager 441 and controller/processor 490 is used to determine Q1 indication information groups, second information and third information.

In one subembodiment, at least the former of beam manager 441 and controller/processor 490 is used to determine the first information.

In one subembodiment, at least the first two of the transmitter 416, the transmitting processor 415, and the controller/processor 440 are used to transmit Q1 indication information groups, and the Q1 indication information groups correspond to Q1 time slices respectively.

In one subembodiment, at least the first two of the transmitter 416, the transmission processor 415, and the controller/processor 440 are used to transmit Q2 reference signals in Q2 time slices of the first frequency sub-band respectively.

In one subembodiment, at least the first two of the receiver 416, the receiver processor 412, and the controller/processor 440 are used to receive the first information.

In one subembodiment, at least the first two of the transmitter 416, the transmitting processor 415 and the controller/processor 440 are used for transmitting second information.

In one subembodiment, at least the first two of the transmitter 416, the transmitting processor 415 and the controller/processor 440 are used for transmitting third information.

In one subembodiment, at least the first two of the transmitter 416, the transmitting processor 415 and the controller/processor 440 are used for transmitting a first radio signal.

In one subembodiment, at least the former of the beam manager 471 and the controller/processor 490 is used to determine Q1 indication information groups, second information and third information.

In one subembodiment, at least the first two of the receiver 416, the receiver processor 412, and the controller/processor 440 are used to perform Q1 energy detections in Q1 time intervals respectively.

Embodiment 5

Figure 5:
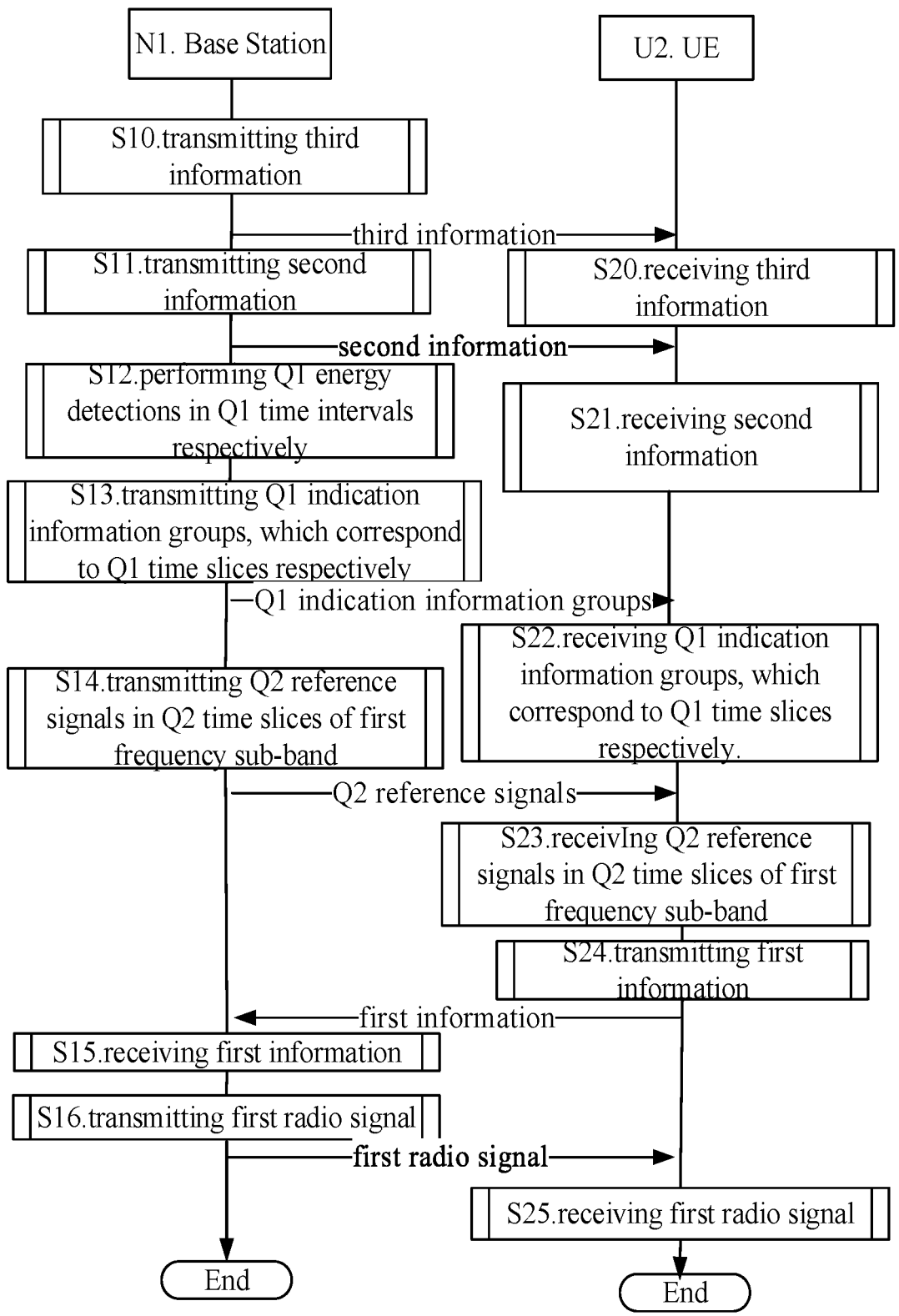
FIG. 5 illustrates a flowchart of a second information according to one embodiment of the present disclosure.

Embodiment 5 illustrates a flowchart of second information, as shown in FIG. 5. In FIG. 5, a base station N1 is a maintenance base station for a serving cell of a UE U2.

For base station N1 transmits third information in step S10; transmits second information in step S11; performs Q1 energy detections in Q1 time intervals in step S12; transmits Q1 indication information groups in step S13, which corresponds to Q1 time slices respectively; transmits Q2 reference signals respectively in Q2 time slices of a first frequency sub-band in step S14; receives first information in step S15; and transmits a first radio signal in step S16.

For UE U2 receives third information in step S20; receives second information in step S22; receives Q1 indication information groups in step 22, which corresponds to Q1 time slices respectively; receives Q2 reference signals respectively in Q2 time slices of a first frequency sub-band in step S23; transmits first information in step S24; and receives a first radio signal in step 25.

In embodiment 5, a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of indication information, and all indication information comprised in the Q1 indication information groups is dynamically configured; the second information is used to determine a first index set, the first index set comprises a positive integer number of index(es), and the Q1 indication information groups are used to determine Q1 indexes respectively; Q2 indication information groups in the Q1 indication information groups correspond to the Q2 time slices, and Q2 indexes corresponding to the Q2 indication information groups belong to the first index set; wherein a given reference signal is any reference signal of the Q2 reference signals, and the third information is used to determine at least the former between frequency domain resources occupied by the given reference signal and a period configured by the given reference signal; wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to the antenna ports comprised in the Q2 antenna port groups; the UE U2 receives the first radio signal in the candidate antenna port set; the base station N1 transmits the first radio signal in the candidate antenna port set; the M is a positive integer; the given indication information group is any of the Q1 indication information groups, the given indication information group comprises N piece(s) of indication information, the N piece(s) of indication information respectively indicates that N multi-carrier symbol group(s) is(are) occupied, and any of the N multi-carrier symbol group(s) comprises a positive integer number of multi-carrier symbol(s); wherein the Q1 time intervals correspond to the Q1 time slices respectively, and the base station N1 determines that the first frequency sub-band is idle in the Q1 time slices through the Q1 energy detections; the Q1 indication information groups, the Q2 reference signals, the first information, the second information, and the third information are all transmitted through an air interface.

In one subembodiment, any of the Q1 indexes is a non-negative integer.

In one subembodiment, the first index set is composed of Q2 indexes.

In one subembodiment, any two of the Q2 indexes are different.

In one subembodiment, the Q2 indexes are the newly received indexes among the Q1 indexes, which belong to the first index set and are different from each other.

In one subembodiment, the second information is semi-statically configured.

In one subembodiment, the second information is a higher layer signaling.

In one subembodiment, the second information is configured through an RRC signaling.

In one subembodiment, the phrase that the Q1 indication information groups are respectively used to determine Q1 indexes refers to: the given indication information group is any of the Q1 indication information groups. The given indication information group corresponds to the given index, and the given index is an index corresponding to a given indication information group among the Q1 indexes; the given indication information group comprises N indication information, of which the indication information sent first in time domain indicates the given index.

In one subembodiment, the phrase that the Q1 indication information groups are respectively used to determine Q1 indexes refers to: the given indication information group is any of the Q1 indication information groups. The given indication information group corresponds to the given index, and the given index is an index corresponding to a given indication information group among the Q1 indexes; the given indication information group comprises N indication information, each of which indicates the given index.

In one subembodiment, the given reference signal comprises a positive integer number of reference sub-signal(s), and the third information is used to determine frequency domain resource occupied by the positive integer number of reference sub-signal(s).

In one subembodiment, the given reference signal comprises a positive integer number of reference sub-signal(s), and the third information is used to determine the period configured by the positive integer reference sub-signal(s).

In one subembodiment, the third information is transmitted through an RRC signaling.

In one subembodiment, the given reference signal comprises a CSI-RS.

In one subembodiment, the given reference signal comprises a Discovery Reference Signal (DRS).

In one subembodiment, the M is equal to 1, and the candidate antenna port set only comprises one candidate antenna port.

In one subembodiment, the candidate antenna port set corresponds to a CSI-RS index.

In one subembodiment, the candidate antenna port set is one of the Q2 antenna port groups.

In one subembodiment, the candidate antenna port set is one of all antenna ports comprised in the Q2 antenna port groups.

In one subembodiment, any group of the Q2 antenna port groups comprises a positive integer number of antenna port subgroup(s), and the candidate antenna port set is one of all the antenna port subgroups comprised in the Q2 antenna port groups.

In one subembodiment, the candidate antenna port set comprises at least a first antenna port and a second antenna port; the first antenna port belongs to a first antenna port group, and the second antenna port belongs to a second antenna port group; the first antenna port group and the second antenna port group are two different antenna port groups among the Q2 antenna port groups.

In one subembodiment, a last time slice of the Q2 time slices in time domain is a target time slice, the end time of the target time slice in time domain is T1, the UE U2 transmits the first information in a first time window, the start time of the first time window in time domain is T2, the difference between T2 and T1 is equal to T3, and the T3 is not less than a first time threshold; the units of the T1, the T2, the T3 and the first time threshold are all measured by milliseconds.

In one subsidiary embodiment of the subembodiment, the first time threshold is fixed.

In one subsidiary embodiment of the subembodiment, the first time threshold is configured through an RRC signaling.

In one subembodiment, the first radio signal is a Downlink Grant, or the first radio signal is an Uplink Grant.

In one subembodiment, the transmission channel corresponding to the first radio signal is a Downlink Shared Channel (DL-SCH).

In one subembodiment, the phrase that the UE U2 receives the first radio signal in the candidate antenna port set refers to: the UE U2 infers a receiving beam corresponding to the first radio signal from a receiving beam corresponding to a radio signal received on the candidate antenna port set.

In one subembodiment, the phrase that the UE U2 receives the first radio signal in the candidate antenna port set refers to: the UE U2 receives the first radio signal using a receiving beam corresponding to the radio signal received on the candidate antenna port set.

In one subembodiment, the phrase that the UE U2 receives the first radio signal in the candidate antenna port set refers to: the UE U2 receives a radio signal and the first radio signal transmitted on the candidate antenna port set with the same beamforming vector.

In one subembodiment, the phrase that the UE U2 receives the first radio signal in the candidate antenna port set refers to: the UE U2 infers the reception spatial filtering corresponding to the first radio signal from the reception spatial filtering corresponding to a radio signal received on the candidate antenna port set.

In one subembodiment, the phrase that the UE U2 receives the first radio signal in the candidate antenna port set refers to: the UE U2 receives a radio signal and the first radio signal transmitted on the candidate antenna port set with the same reception spatial filtering.

In one subembodiment, the indication information is a dynamic signaling.

In one subembodiment, the newly received Q1 dynamic signaling groups respectively comprise the Q1 indication information groups.

In one subsidiary embodiment of the subembodiment, the Q1 dynamic signaling groups are respectively Q1 Downlink Control Information (DCI) sets, and any of the Q1 dynamic signaling groups comprises a positive integer number of dynamic signaling(s).

In one subsidiary embodiment of the subembodiment, all dynamic signalings comprised in the Q1 dynamic signaling groups are identified by a given identity.

In one example of the subsidiary embodiment, the phrase that all the dynamic signalings comprised in the Q1 dynamic signaling groups are identified by a given identity refers to: a target dynamic signaling is any of the dynamic signaling. A Cyclic Redundancy Check (CRC) comprised in the target dynamic signaling is scrambled with the given identity.

In one example of the subsidiary embodiment, the given identity is 16 binary bits.

In one example of the subsidiary embodiment, the given identity is used for the scrambling code of indication information in the Q1 indication information groups.

In one example of the subsidiary embodiment, the given identity is a Common Control Radio Network Temporary Identifier (CC-RNTI).

In one example of the subsidiary embodiment, the given identity is used to identify that the target multi-carrier symbol group is occupied by the transmitter of the indication information, and the target multi-carrier symbol group is indicated by indication information corresponding to the given identity.

In one example of the subsidiary embodiment, the given identity is used to determine Search Space corresponding to each indication information comprised in the Q1 indication information groups, the Search Space comprises multiple RE groups, and the RE occupied by the corresponding indication information is one group among the multiple RE groups, and the RE group includes multiple REs.

In one example of the subsidiary embodiment, the given identity is cell-common.

In one example of the subsidiary embodiment, the given identity is specific to a terminal group, and the UE U2 is a terminal in the terminal group.

In one subembodiment, the N piece(s) of indication information is all cell-common.

In one subembodiment, there does not exist one multi-carrier symbol belonging to two multi-carrier symbol groups comprised in the N multi-carrier symbol group(s) at the same time.

In one subembodiment, all multi-carrier symbols of any multi-carrier symbol group in the N multi-carrier symbol group(s) are continuous.

In one subembodiment, the N piece(s) of indication information is specific to the terminal group, and the UE U2 is a terminal in the terminal group.

In one subembodiment, the N piece(s) of indication information is transmitted on the first frequency sub-band, and the first frequency sub-band is deployed on the unauthorized spectrum.

In one subembodiment, each of the N piece(s) of indication information is DCI identified by CC-RNTI.

In one subsidiary embodiment of the subembodiment, the CC-RNTI is used to generate an RS sequence of a Demodulation Reference Signal (DMRS) corresponding to the N piece(s) of indication information.

In one subembodiment, the CRC bit sequences of the N piece(s) of indication information are all scrambled by CC-RNTI.

In one subembodiment, there is no unoccupied multi-carrier symbol between any two consecutive indication information of the N piece(s) of indication information.

In one subembodiment, the N piece(s) of indication information respectively indicates length(s) of the N multi-carrier symbol group(s).

In one subsidiary embodiment of the subembodiment, the phrase that the N piece(s) of indication information respectively indicates lengths of the N multi-carrier symbol group(s) refers to: the given indication information is any of the N piece(s) of indication information, indicating the length of the given multi-carrier symbol group, which is the multi-carrier symbol group corresponding to the given indication information in the N multi-carrier symbol groups; the given indication information indicates a number of multi-carrier symbols occupied by the given multi-carrier symbol group in time domain.

In one example of the subsidiary embodiment, the multi-carrier symbols occupied in time domain are continuous.

In one subembodiment, the Q1 energy detections respectively correspond to the Q1 LBT processes.

In one subembodiment, the given time interval is any of the Q1 time intervals, the given time interval corresponds to a given time slice, and the given time slice is the time slice in the Q1 time slices corresponding to the given time interval; there is no unoccupied multi-carrier symbol between the given time interval and the given time slice.

In one subembodiment, the Q1 time intervals are respectively located before the Q1 time slices in time domain.

In one subembodiment, the phrase that the first frequency sub-band is idle in the Q1 time slices refers to: the base station N1 considers that the first frequency sub-band is not occupied by the transmitter other than the base station N1 in the Q1 time slices.

In one subembodiment, the phrase that the first frequency sub-band is idle in the Q1 time slices refers to: each of the energy of the wireless signals obtained by the base station N1 in the first frequency sub-band in a given time interval is less than a given threshold, and the given time interval is any of the Q1 time intervals.

Embodiment 6

Figure 6:
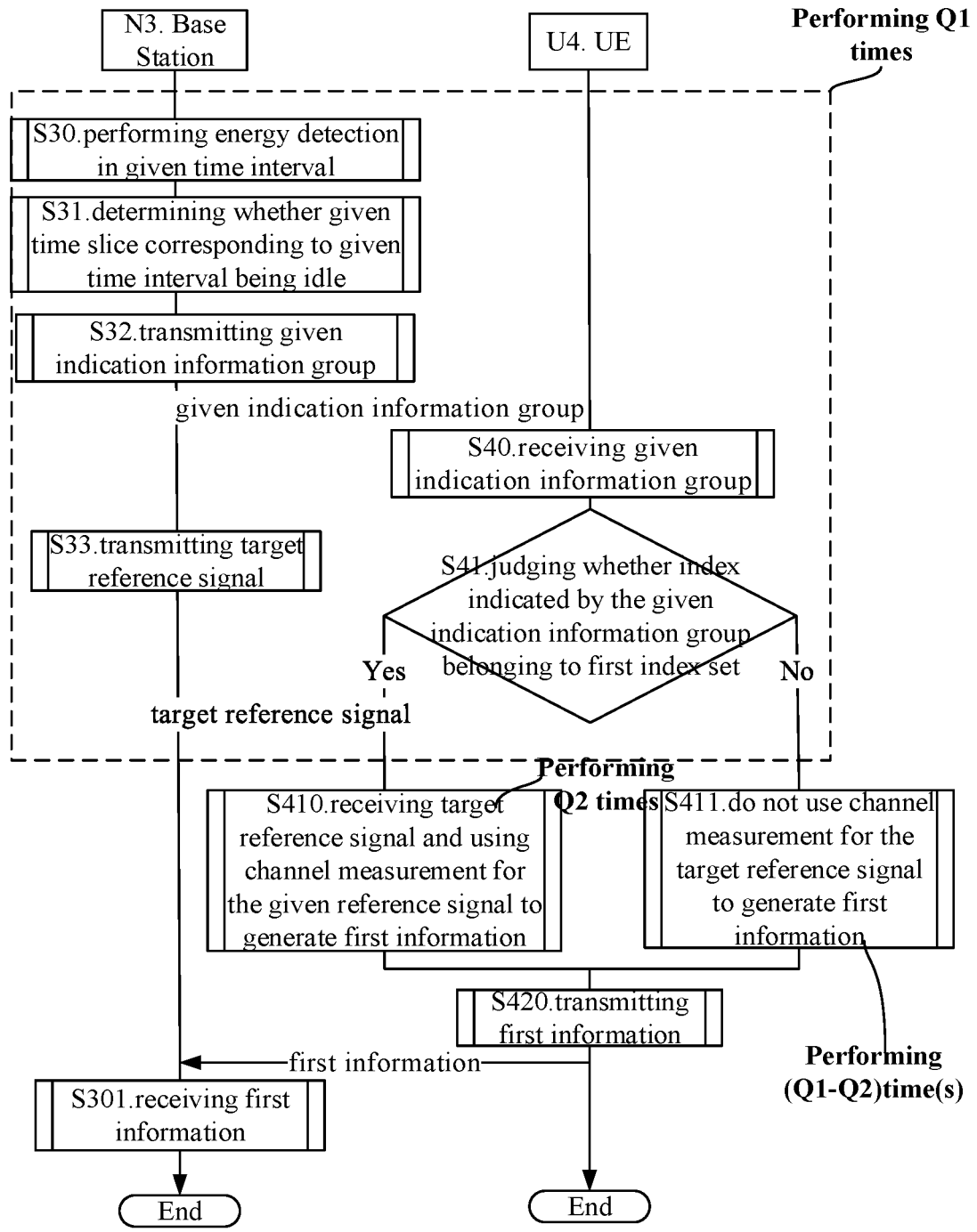
FIG. 6 illustrates a flowchart of generating a first information according to one embodiment of the present disclosure.

Embodiment 6 illustrates a flowchart for generating first information, as shown in FIG. 6. FIG. 6 is a refinement of steps S12 to S15 on the side of base station N1 and steps S22 to S24 on the side of UE U2 in Embodiment 5.

In FIG. 6, base station N3 performs an energy detection once in a given time interval in step S30; determines whether a given time slice corresponding to a given time interval is idle in step S31; transmits a given indication information group in step S32; transmits a target reference signal in step S33; receives first information in step S301; wherein the step S30 to step S33 are executed Q1 times before step S301.

In FIG. 6, UE U4 receives a given indication information group in step S40; determines whether the index indicated by the given indication information group belongs to a first index set in step S41, if "yes" goes to step S410, if "no" goes to step S411; receives a target reference signal and uses a channel measurement for the target reference signal to generate first information in step S410; the channel measurement for the target reference signal is not used to generate first information in step S411; transmits first information in step S42; wherein the step S40 and the step S41 are executed Q1 times before step S420, the step S410 is executed Q2 times before the step S420, and the step S411 is executed (Q1-Q2) times before the step S420.

In Embodiment 6, a given time interval is any of the Q1 time intervals in the present disclosure, and the given time slice is the time slice corresponds to the given time interval in the Q1 time slices in the present disclosure; the target reference signal is a reference signal transmitted in the given time slice.

In one subembodiment, any of the Q2 reference signals is the target reference signal.

In one subembodiment, when the given index indicated by the given indication information group does not belong to the first index set, the UE U4 receives the target reference signal, but the channel measurement for the target reference signal is not used to generate the first information.

In one subembodiment, when the index indicated by the given indication information group does not belong to the first index set, the UE U4 doesn't receive the target reference signal.

Embodiment 7

Figure 7:
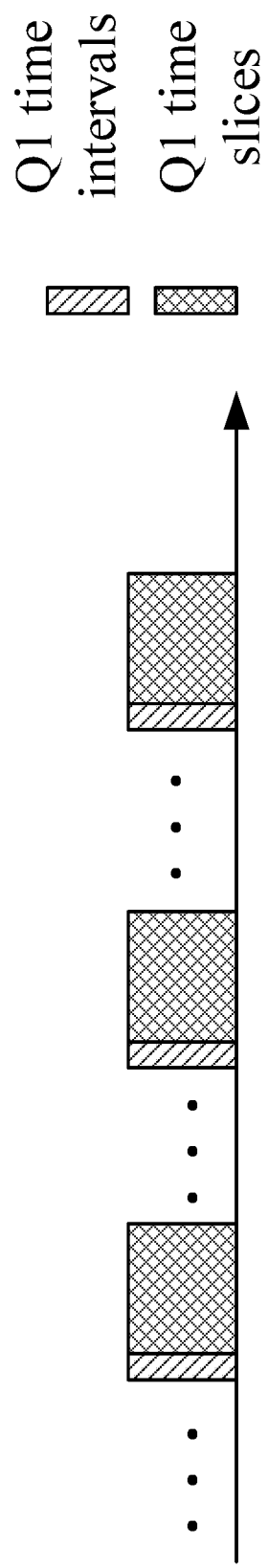
FIG. 7 illustrates a schematic diagram of Q1 time slices according to one embodiment of the present disclosure.

Embodiment 7 illustrates a schematic diagram of Q1 time slices, as shown in FIG. 7. In FIG. 7, the Q1 time intervals in the disclosure respectively correspond to the Q1 time slices one by one.

In one subembodiment, the Q1 time slices respectively correspond to Q1 downlink bursts.

In one subembodiment, each of the duration of the Q1 time slices in time domain is no longer than one Max Channel Occupy Time (MCOT).

In one subembodiment, any two of the Q1 time slices that are adjacent in the time domain are discontinuous.

In one subembodiment, the Q1 time intervals and the Q1 time slices are respectively continuous in time domain.

Embodiment 8

Figure 8:
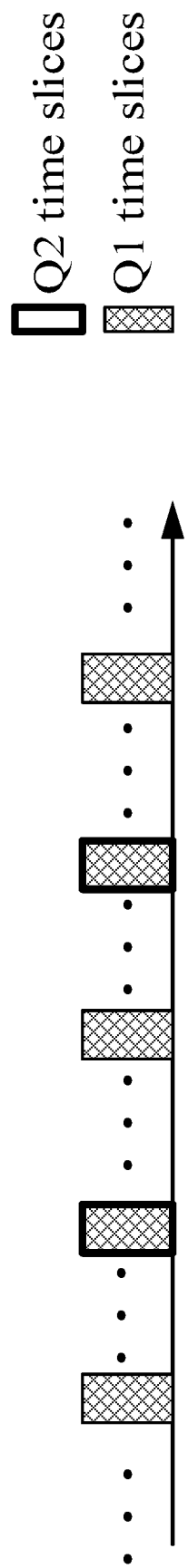
FIG. 8 illustrates a schematic diagram of the relationship between Q2 time slices and Q1 time slices according to one embodiment of the present disclosure.

Embodiment 8 illustrates a schematic diagram of the relationship between Q2 time slices and Q1 time slices, as shown in FIG. 8. In FIG. 8, the Q2 time slices belong to the Q1 time slices, the Q2 is a positive integer not greater than Q1, and the Q1 is a positive integer; Q1 indication information groups correspond to the Q1 time slices, Q2 indication information groups in the Q1 indication information groups correspond to the Q2 time slices one by one, and Q2 indexes corresponding to the Q2 indication information groups belong to the first index set.

In one subembodiment, each of Q2 indexes corresponding to the Q2 time slices belong to the first index set.

In one subembodiment, the first index set comprises a positive integer number of index(es).

In one subembodiment, the first index set comprises one index.

In one subembodiment, the Q2 time slices at least comprise a first time slice and a second time slice, and the first time slice and the second time slice are two non-adjacent time slices in the Q1 time slices.

Embodiment 9

Figure 9:
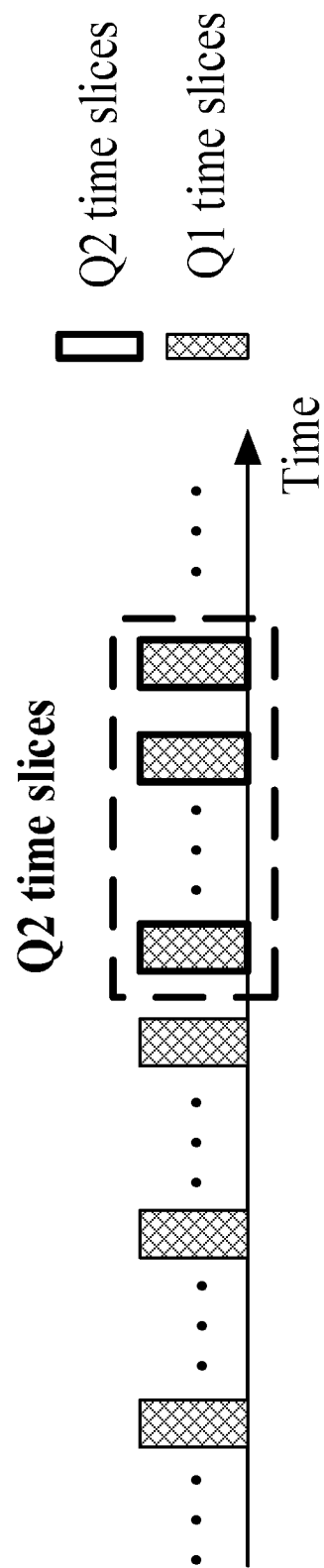
FIG. 9 illustrates a schematic diagram of the relationship between Q2 time slices and Q1 time slices according to another embodiment of the present disclosure.

Embodiment 9 illustrates a schematic diagram of the relationship between another Q2 time slices and Q1 time slices, as shown in FIG. 9. In FIG. 9, the Q2 time slices belong to the Q1 time slices, the Q2 is a positive integer not greater than Q1, and the Q1 is a positive integer; the Q2 time slices are the latest time slices among the Q1 time slices.

In one subembodiment, the phrase that the Q2 time slices is the latest time slices in the Q1 time slices refers to: the Q2 time slices are time slices located last in time domain in the Q1 time slices.

In one subembodiment, the UE starts to send the first information at a given time, and the Q2 time slices are Q2 time slices closest to the given time.

In one subembodiment, the first information comprises Y bit(s), and the Y bit(s) is(are) used to determine a time slice from the Q2 time slices, and the Y is the largest positive integer less than [$\log_2(Q2)+1$].

In one subembodiment, the Q2 time slices are continuous in the Q1 time slices.

Embodiment 10

Figure 10:
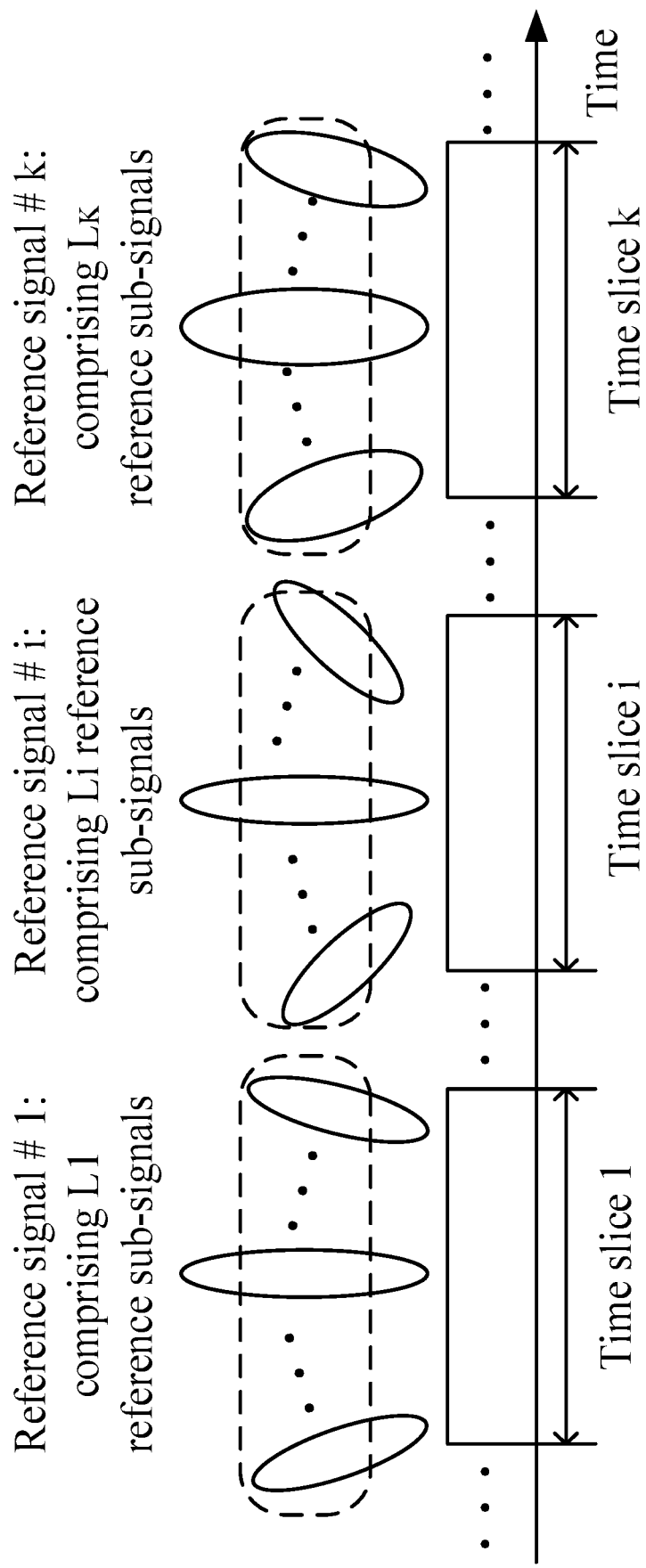
FIG. 10 illustrates a schematic diagram of Q2 reference signals according to one embodiment of the present disclosure.

Embodiment 10 illustrates a schematic diagram of Q2 reference signals, as shown in FIG. 10. In FIG. 10, the Q2 is equal to K, the Q2 reference signals correspond to K reference signals, the K reference signals correspond to K time slices, and the K reference signals correspond to reference signal #1 to # K respectively; reference signal # i is the ith reference signal from the reference signal #1 to the # K, i is a positive integer not less than 1 and not greater than K; the reference signal # i comprise $L_i$ reference sub-signals, and the $L_i$ is a positive integer.

In one subembodiment, the Q2 reference signals comprise a total of R reference sub-signals, and R is equal to $$\sum_{i=1}^{K} L_i \,.$$

In one subsidiary embodiment of the subembodiment, the Q2 reference signals respectively correspond to Q2 antenna port groups.

In one subsidiary embodiment of the subembodiment, the R reference sub-signal(s) respectively correspond(s) to R antenna port(s).

In one subsidiary embodiment of the subembodiment, the first information is used to determine an antenna port group from the Q antenna port groups.

In one subsidiary embodiment of the subembodiment, the first information is used to determine an antenna port from the R antenna port(s).

In one subsidiary embodiment of the subembodiment, the first information is used to determine an antenna port set from the R antenna port(s), the antenna port set comprises M antenna port(s), the M antenna port(s) belong(s) to the R antenna port(s), and the M is not greater than the R.

In one subembodiment, the Q2 antenna port groups correspond to Q2 beamforming vectors.

In one subembodiment, the R antenna ports correspond to R beamforming vectors.

In one subsidiary embodiment of the above two subembodiments, the beamforming vectors comprise one of {analog beamforming vector and digital beamforming vector}.

In one subsidiary embodiment of the above two subembodiments, the beamforming vector is used for the generation of the received beam.

In one subembodiment, the reference sub-signal comprises at least one of {CSI-RS, DMRS, SS}.

Embodiment 11

Figure 11:
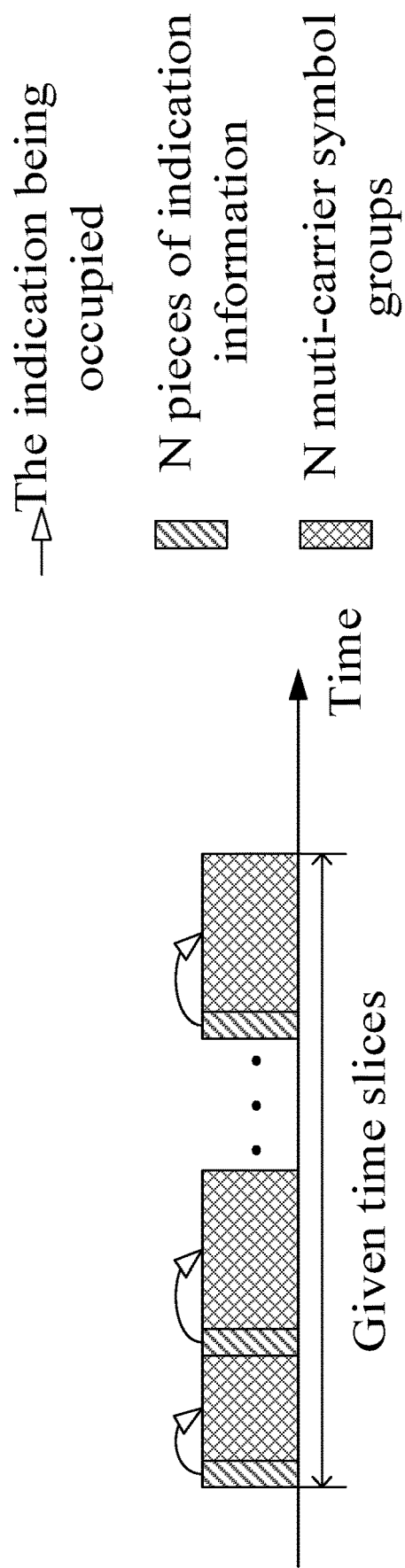
FIG. 11 illustrates a schematic diagram of a given indication information group according to one embodiment of the present disclosure.

Embodiment 11 illustrates a schematic diagram of a given indication information group, as shown in FIG. 11. In FIG. 11, the given indication information group is any of the Q1 indication information groups in the present disclosure, and the given indication information group comprises N piece(s) of indication information, and the N piece(s) of indication information is respectively used to indicate that N multi-carrier symbol group(s) is(are) occupied, and any of the multi-carrier symbol groups comprises a positive integer number of multi-carrier symbol(s); the given time slice shown in the figure is the occupied time slice of the given indication information group.

In one subembodiment, a number of multi-carrier symbols comprised in any of the multi-carrier symbol groups is greater than 1.

In one subembodiment, time domain resources occupied by the indication information and time domain resources occupied by the multi-carrier symbol groups indicated by the indication information are continuous in time domain.

In one subembodiment, both time-domain resources occupied by the indication information and time-domain resources occupied by multi-carrier symbol groups indicated by the indication information belong to a slot.

In one subembodiment, both time domain resources occupied by the indication information and time domain resources occupied by multi-carrier symbol groups indicated by the indication information belong to a subframe.

Embodiment 12

Figure 12:
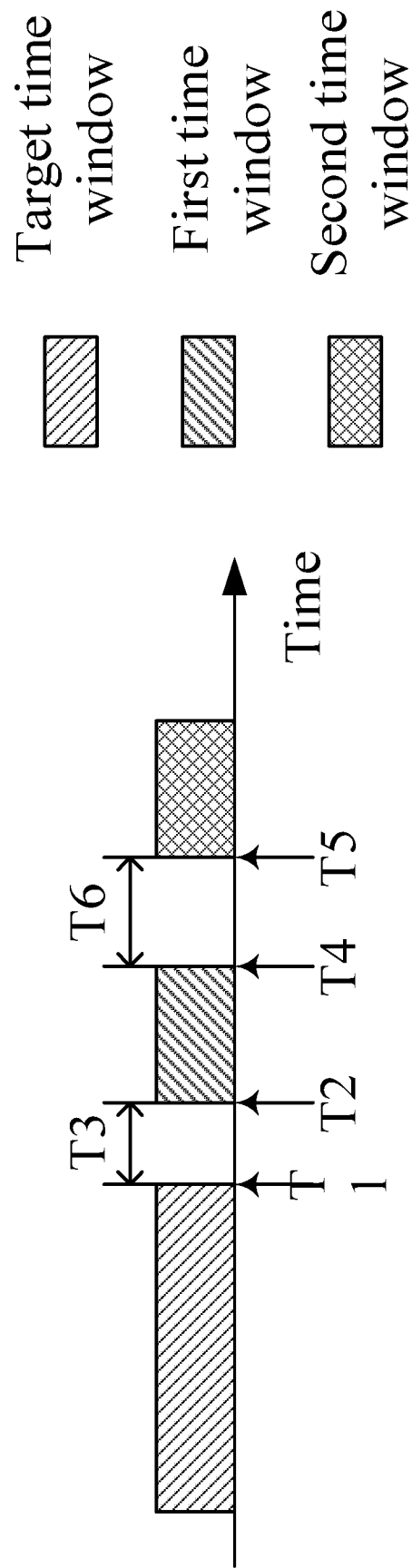
FIG. 12 illustrates a sequence diagram according to one embodiment of the present disclosure.

Embodiment 12 illustrates a sequence diagram corresponding to the present disclosure, as shown in FIG. 12. In FIG. 12, based on the time sequence of UE, each of the Q1 time slices in the disclosure belongs to the target time window. The first information in the disclosure is transmitted in a first time window, and the first radio signal in the disclosure is received in a second time window; the end time of the target time window is T1, the start time of the first time window is T2, a difference between the T2 and the T1 is T3, the end time of the first time window is T4, the start time of the second time window is T5, and a difference between the T5 and the T4 is T6.

In one subembodiment, the T3 is not less than a first time threshold, the first time threshold is fixed, or the first time threshold is configured through RRC signaling.

In one subsidiary embodiment of the subembodiment, the first time threshold is not less than 4 milliseconds.

In one subsidiary embodiment of the subembodiment, the first time threshold is not less than time length occupied by four slots.

In one subembodiment, the T4 is not less than a second time threshold, the second time threshold is fixed, or the second time threshold is configured through an RRC signaling.

In one subsidiary embodiment of the subembodiment, the second time threshold is not less than 4 milliseconds.

In one subsidiary embodiment of the subembodiment, the second time threshold is not less than time length occupied by four slots.

In one subembodiment, the duration of the first time window in time domain is fixed, or the duration of the first time window in time domain is configured by RRC signaling.

In one subsidiary embodiment of the subembodiment, the base station in the present disclosure does not detect the first information after the first time window.

Embodiment 13

Figure 13:
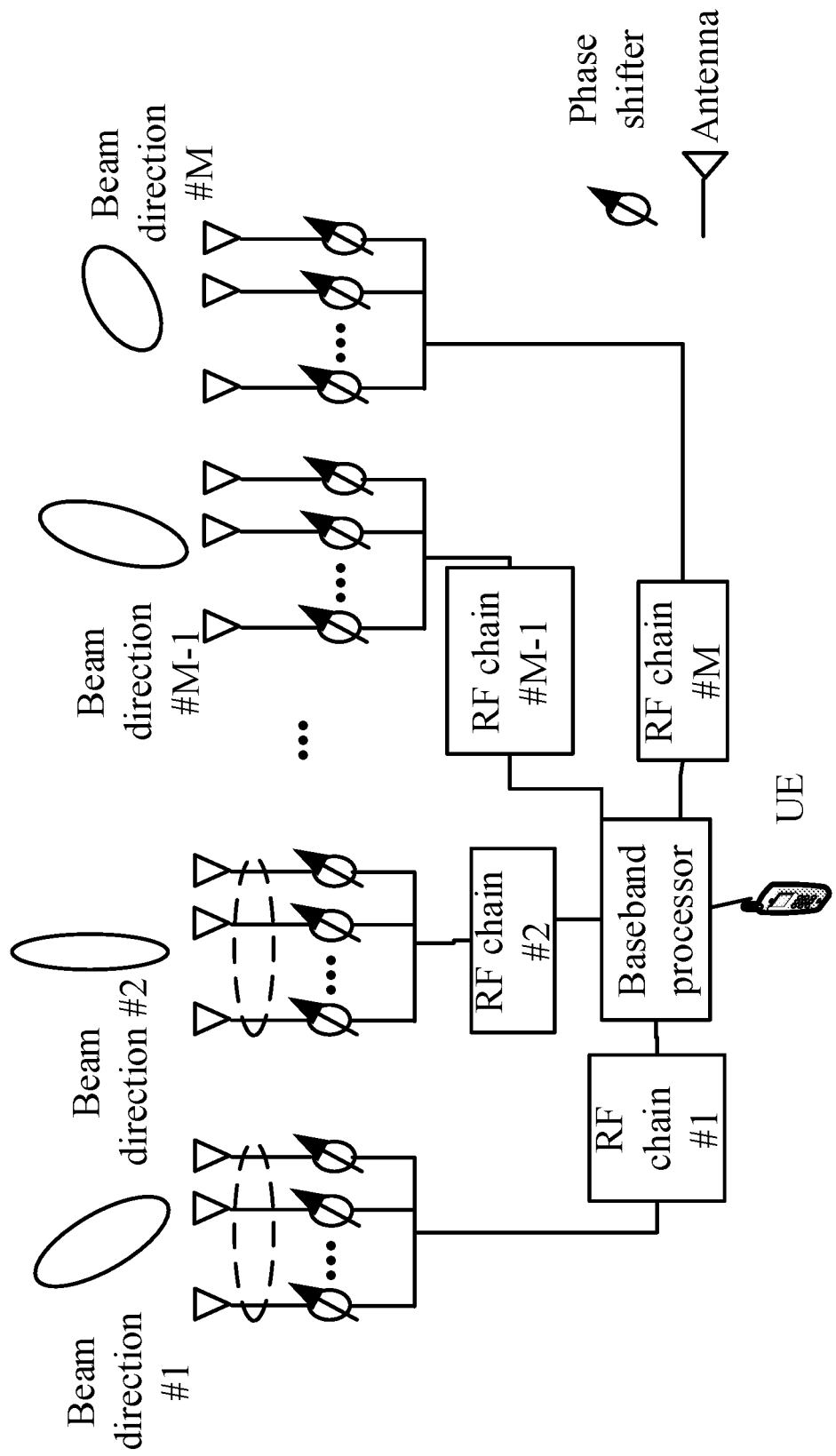
FIG. 13 illustrates the schematic diagram of antenna structure of UE according to one embodiment of the present disclosure.

Embodiment 13 illustrates a schematic diagram of an antenna structure with an equipped UE, as shown in FIG. 13. As shown in FIG. 13, the UE is equipped with M RF chain(s), i.e. RF chain #1, RF chain #2, . . . , RF chain # M. The M RF chain(s) is(are) connected to a baseband processor.

In one subembodiment, the bandwidth supported by any of the M RF chains does not exceed the bandwidth of the frequency sub-band configured for the UE.

In one subembodiment, M1 RF chains in the M RF chains are superposed to generate an antenna port through antenna virtualization, and the M1 RF chains are respectively connected to M1 antenna groups, and each antenna group in the M1 antenna group(s) comprises a positive integer and an antenna. An antenna group is connected to the baseband processor through an RF chain, and different antenna groups correspond to different RF chains. A mapping coefficient of an antenna to the antenna port comprised in any antenna in the M1 antenna groups constitutes the analog beamforming vectors of the antenna group. The corresponding analog beamforming vectors of the M1 antenna groups are diagonally arranged to form the analog beamforming matrix of the antenna port. The mapping coefficients from the M1 antenna groups to the antenna port constitute the digital beamforming vectors of the antenna port.

In one subembodiment, the M1 RF chains belong to the same panel.

In one subembodiment, the M1 RF chains are Quasi Co-located (QCL).

In one subembodiment, the M2 RF chains in the M RF chains generate a receiving beam through the superposition of antenna virtualization, and the M2 RF chains are respectively connected with M2 antenna groups, each of which comprises a positive integer and an antenna. An antenna group is connected to the baseband processor through an RF chain, and different antenna groups correspond to different RF chains. A mapping coefficient of an antenna to the receiving beam comprised in any group in the M2 antenna groups forms an analog beamforming vector of the receiving beam. The corresponding analog beamforming vectors of the M2 antenna groups are diagonally arranged to form the analog beamforming matrix of the receiving beam. The mapping coefficient from the M2 antenna groups to the receiving beams form the digital beamforming vector of the receiving beams.

In one subembodiment, the M1 RF chains belong to the same panel.

In one subembodiment, the M2 RF chains are QCL.

In one subembodiment, the directions of the analog beams formed by the M RF chains are respectively shown in beam direction #1, beam direction #2, beam direction # M−1, and beam direction # M in FIG. 9.

In one subembodiment, layer to antenna ports are mapped one by one.

In one subembodiment, one layer is mapped to multiple antenna ports.

In one subembodiment, the M is an even number, and RF chain #1, RF chain #2, . . . , RF chain # M/2 of the M RF chains are connected to a first panel, and RF chain # M/2+1, RF chain # M/2+2, . . . , and RF chain # M of the M RF chains are connected to a second panel.

In one subembodiment, the first panel and the second panel respectively adopt different crystal oscillators.

In one subembodiment, the M RF chains correspond to one panel.

Embodiment 14

Figure 14:
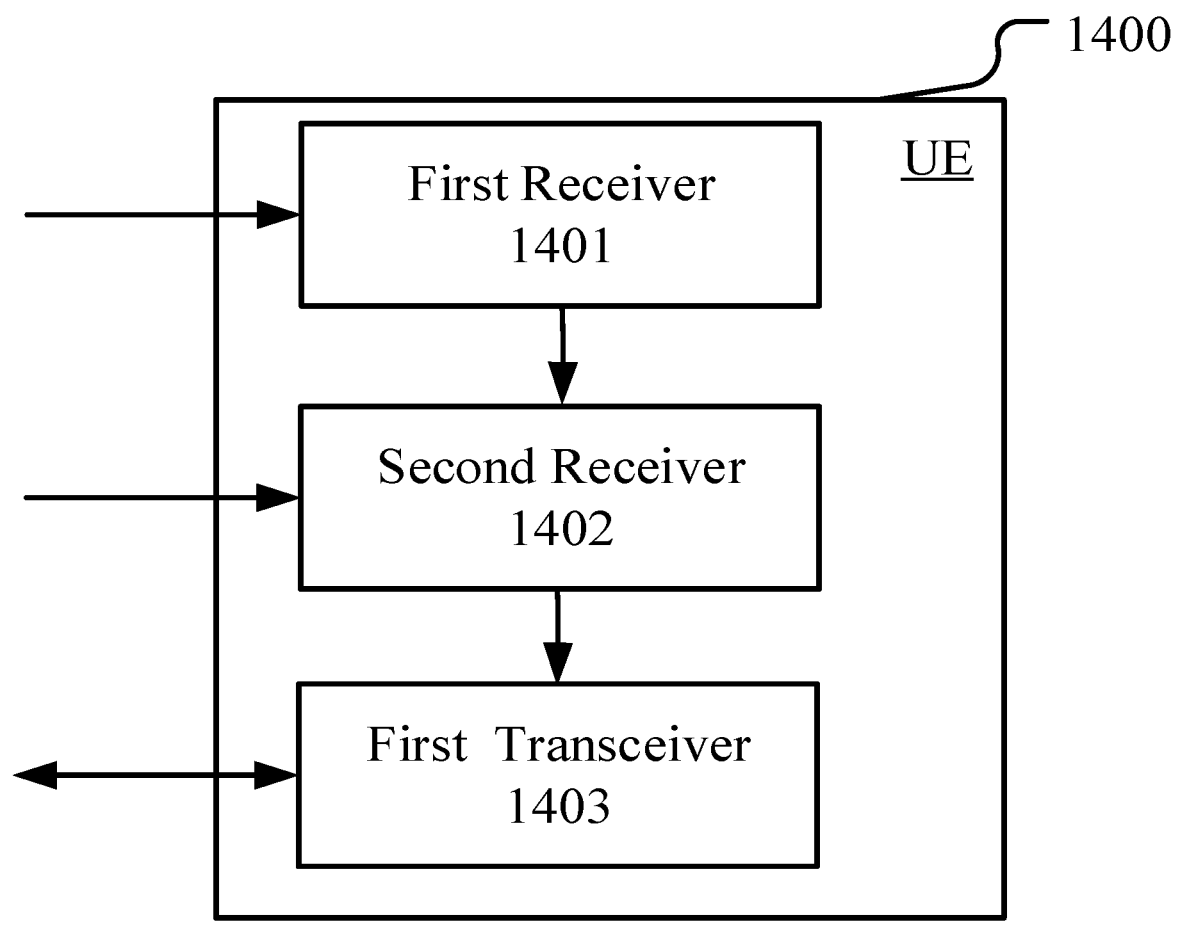
FIG. 14 illustrates a structure block diagram of a processing device in UE according to one embodiment of the present disclosure.

Embodiment 14 illustrates the structure diagram of a processing device in a UE, as shown in FIG. 14. In FIG. 14, UE processing device 1400 is mainly composed of a first receiver 1401, a second receiver 1402 and a first transceiver 1403.

a first receiver 1401, receiving Q1 indication information groups, which correspond to Q1 time slices respectively, the Q1 being a positive integer;

a second receiver 1402, respectively receiving Q2 reference signals in Q2 time slices of a first frequency sub-band;

a first transceiver 1403, transmitting first information;

In embodiment 14, a channel measurement for the Q2 reference signals is used to generate the first information, and the channel measurement used to generate the first information is limited to the Q2 time slices of the Q1 time slices, and the Q2 is a positive integer not greater than the Q2; the Q1 indication information groups are used to determine the Q2 time slices, and at least one unoccupied multi-carrier symbol is comprised between any two adjacent time slices of the Q2 time slices; any of the Q1 indication information groups comprises a positive integer number of indication information, and all indication information comprised in the Q1 indication information groups is dynamically configured; the Q1 indication information groups, the Q2 reference signals and the first information are all transmitted through an air interface.

In one subembodiment, the first receiver 1401 also receives second information; the second information is used to determine the first index set, the first index set comprises a positive integer number of index(es), and the Q1 indication information groups are used to determine Q1 indexes respectively; Q2 indication information groups in the Q1 indication information groups correspond to the Q2 time slices one by one, and Q2 indexes corresponding to the Q2 indication information groups belong to the first index set; the second information is transmitted through an air interface.

In one subembodiment, the first receiver 1401 also receives third information; wherein a given reference signal is any reference signal among the Q2 reference signals, and the third information is used to determine at least the former between frequency domain resources occupied by the given reference signal and in a period configured by the given reference signal; the third information is transmitted through an air interface.

In one subembodiment, the first transceiver 1403 also receives a first radio signal; wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna ports, and each of the M candidate antenna ports belongs to the antenna ports comprised in the Q2 antenna port groups; the UE receives the first radio signal in the candidate antenna port set; the M is a positive integer.

In one subembodiment, the given indication information group is any of the Q1 indication information groups, the given indication information group comprises N piece(s) of indication information, the N piece(s) of indication information respectively indicate(s) that N multi-carrier symbol group(s) is(are) occupied, and any of the N multi-carrier symbol group(s) comprises a positive integer number of multi-carrier symbol(s).

In one subembodiment, the first receiver 1401 comprises at least the first two of receiver 456, receiving processor 452, beam manager 441, or controller/processor 490 in Embodiment 4.

In one subembodiment, the second receiver 1402 comprises at least the first two of receiver 456, receiving processor 452, or controller/processor 490 in Embodiment 4.

In one subembodiment, the first transceiver 1403 comprises at least the first two of receiver/transmitter 456, receiving processor 452, transmitting processor 455, beam manager 441, or controller/processor 490 in Embodiment 4.

Embodiment 15

Figure 15:
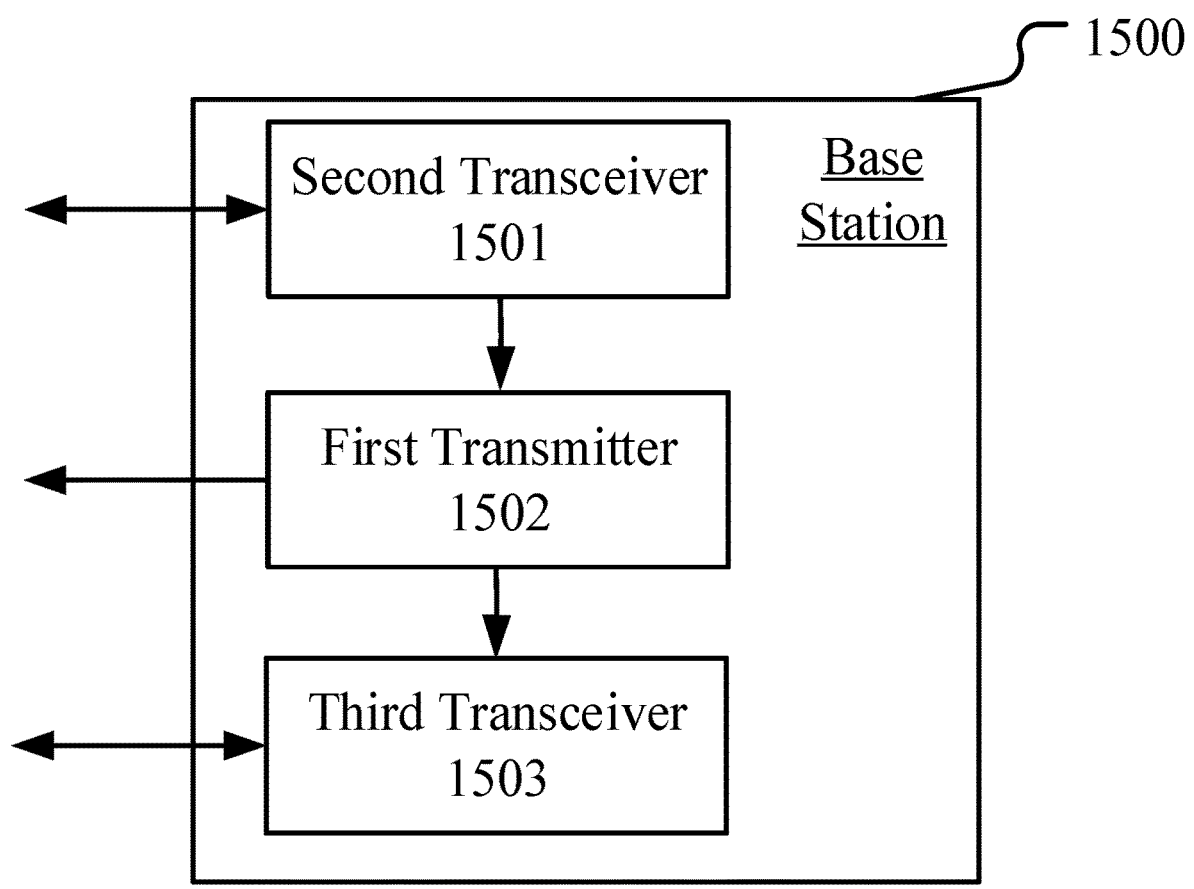
FIG. 15 illustrates a structure block diagram of a processing device in a base station according to one embodiment of the present disclosure.

Embodiment 15 illustrates a structure block diagram of a processing device in a base station, as shown in FIG. 15. In FIG. 15, the base station processing device 1500 is mainly composed of a second transceiver 1501, a first transmitter 1502, and a third transceiver 1503.

a second transceiver 1501, transmitting Q1 indication information groups, and the Q1 indication information groups correspond to Q1 time slices respectively, the Q1 being a positive integer;

a first transmitter 1502, transmitting Q2 reference signals in Q2 time slices of a first frequency sub-band;

a third transceiver 1503, receiving first information;

In Embodiment 15, a channel measurement for the Q2 reference signals is used to generate the first information, and the channel measurement used to generate the first information is limited to the Q2 time slices of the Q2 time slices, and the Q2 is a positive integer not bigger than the Q2; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups are dynamically configured; the Q1 indication information groups, the Q2 reference signals and the first information are all transmitted through an air interface.

In one subembodiment, the second transceiver 1501 also transmits a second information; the second information is used to determine the first index set, the first index set comprises a positive integer number of index(es), and the Q1 indication information groups are used to determine Q1 indexes respectively; Q2 indication information groups in the Q1 indication information groups correspond to the Q2 time slices one by one, and Q2 indexes corresponding to the Q2 indication information groups belong to the first index set; the second information is transmitted through an air interface.

In one subembodiment, the second transceiver 1501 also transmits third information; wherein a given reference signal is any reference signal of the Q2 reference signals, and the third information is used to determine at least the former between frequency domain resources occupied by the given reference signal and a period configured by the given reference signal, the third information is transmitted through an air interface.

In one subembodiment, the third transceiver 1503 also transmits a first radio signal; wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna ports belongs to the antenna ports comprised in the Q2 antenna port groups; the base station transmits the first radio signal in the candidate antenna port set; the M is a positive integer.

In one subembodiment, the given indication information group is any of the Q1 indication information groups, the given indication information group comprises N piece(s) of indication information, the N piece(s) of indication information respectively indicate(s) that N multi-carrier symbol group(s) is(are) occupied, and any of the N multi-carrier symbol group(s) comprises a positive integer number of multi-carrier symbol(s).

In one subembodiment, the second transceiver 1501 also performs Q1 energy detections in Q1 time intervals respectively; wherein the Q1 time intervals correspond to the Q1 time slices respectively, and the base station determines that the first frequency sub-band is idle in the Q1 time slices through the Q1 energy detections.

In one subembodiment, the second transceiver 1501 comprises at least the former two of receiver/transmitter 416, receiving processor 412, transmitting processor 415, beam manager 471, controller/processor 440 in Embodiment 4.

In one subembodiment, the first transmitter 1502 comprises at least the former two of transmitter 416, transmitting processor 415, controller/processor 440 in Embodiment 4.

In one subembodiment, the third transceiver 1503 comprises at least the former two of receiver/transmitter 416, receiving processor 412, transmitting processor 415, beam manager 471, controller/processor 440 in Embodiment 4.

Embodiment 16

Figure 16:
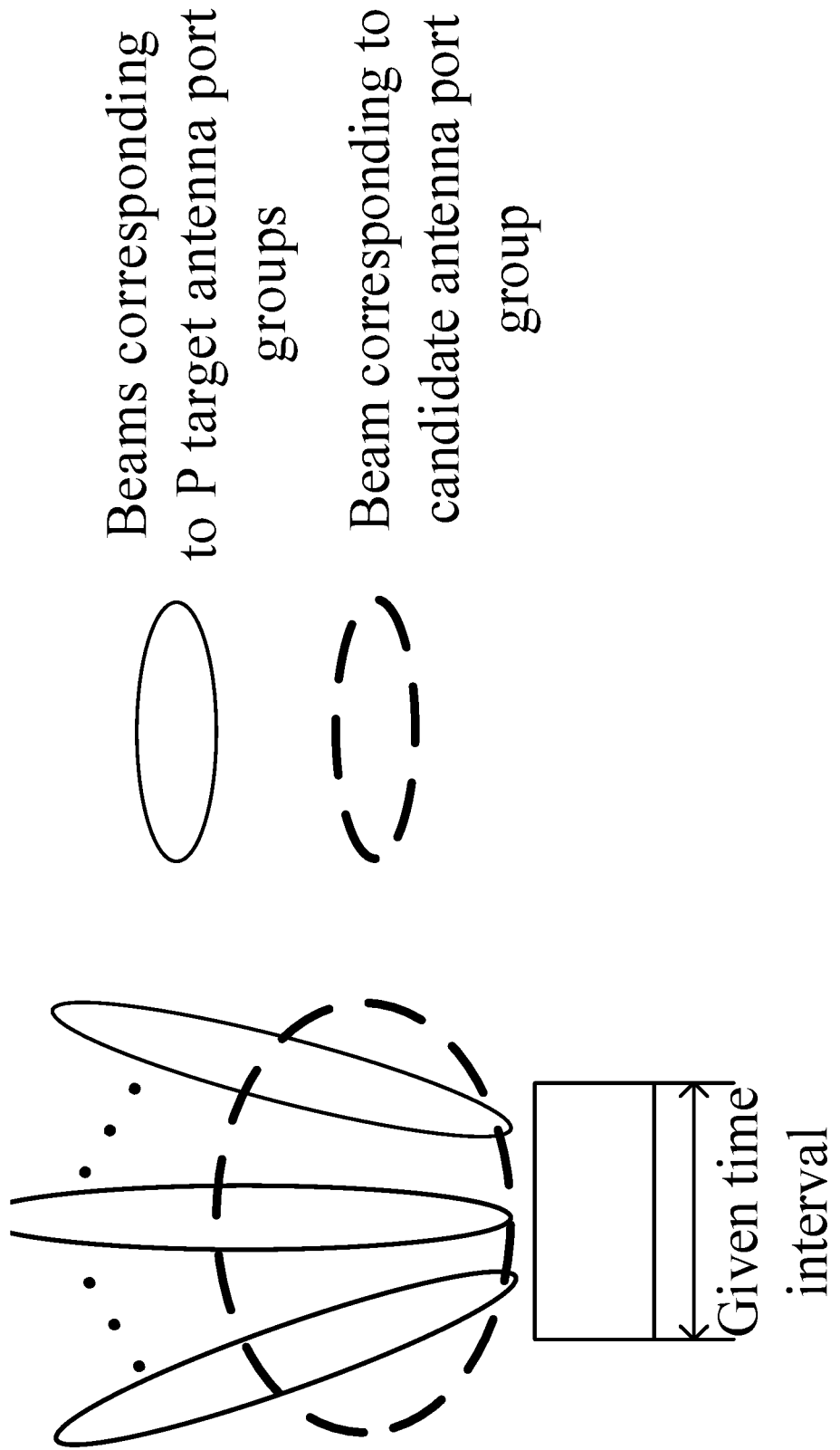
FIG. 16 illustrates the spatial schematic diagram corresponding to an energy detection performed at a given time interval according to one embodiment of the present disclosure.

Embodiment 16 is an example of a spatial schematic diagram for performing energy detection once at a given time interval, as shown in FIG. 16. In FIG. 16, the given time interval is any of the Q2 time intervals, the Q2 time intervals belong to the Q1 time intervals, and the Q2 time intervals correspond to the Q2 time slices in the present disclosure. The base station in the disclosure transmits Q2 reference signals in the Q2 time slices respectively. As shown in FIG. 16, the base station performs energy detection on a candidate antenna port group, and transmits P reference sub-signals on P target antenna port groups in a subsequent given time slice.

In one subembodiment, the candidate antenna port group corresponds to a first-type spatial transmit (Tx) parameter group, and the P reference sub-signal(s) correspond to P second-type spatial transmit (Tx) parameter group(s).

In one subsidiary embodiment of the subembodiment, each of the widths of the beam corresponding to the P second-type spatial transmit (Tx) parameter set(s) is smaller than that corresponding to the first-type spatial transmit (Tx) parameter set(s).

In one subsidiary embodiment of the subembodiment, the first-type spatial transmit (Tx) parameter group is generated by less antennas compared with the given second-type spatial transmit (Tx) parameter. The given second-type spatial transmit (Tx) parameter group is any of the P second-type spatial transmit (Tx) parameter group(s).

In one subsidiary embodiment of the subembodiment, the first-type spatial transmit (Tx) parameter groups correspond to a transmission beamforming vector.

In one subsidiary embodiment of the subembodiment, the P second-type spatial transmit (Tx) parameter set(s) correspond(s) to P transmitting beamforming vector(s) respectively.

In one subembodiment, a given time interval corresponds to the time slice # i in Embodiment 10, and the P reference sub-signal(s) correspond(s) to $L_i$ reference sub-signal(s) in Embodiment 10.

In one subembodiment, the candidate antenna port group comprises a positive integer number of antenna ports.

In one subembodiment, the candidate antenna port group only comprises one antenna port.

In one subembodiment, the given antenna port group is any of the P target antenna port groups, and the given antenna port group comprises a positive integer number of antenna port(s).

In one subembodiment, the given antenna port group is any of the P target antenna port groups, and the given antenna port group only comprises one antenna port.

In one subembodiment, the candidate antenna port group is obtained by a Grid of Beam method.

In one subembodiment, the antennas comprised in the candidate antenna port group adjust power through a weighting coefficient.

In one subembodiment, a beam corresponding to a beamforming vector corresponding to the candidate antenna port group is wider than a given beam, and the given beam is a beam formed by a beamforming vector of any of the P target antenna port group(s).

Embodiment 17

Figure 17:
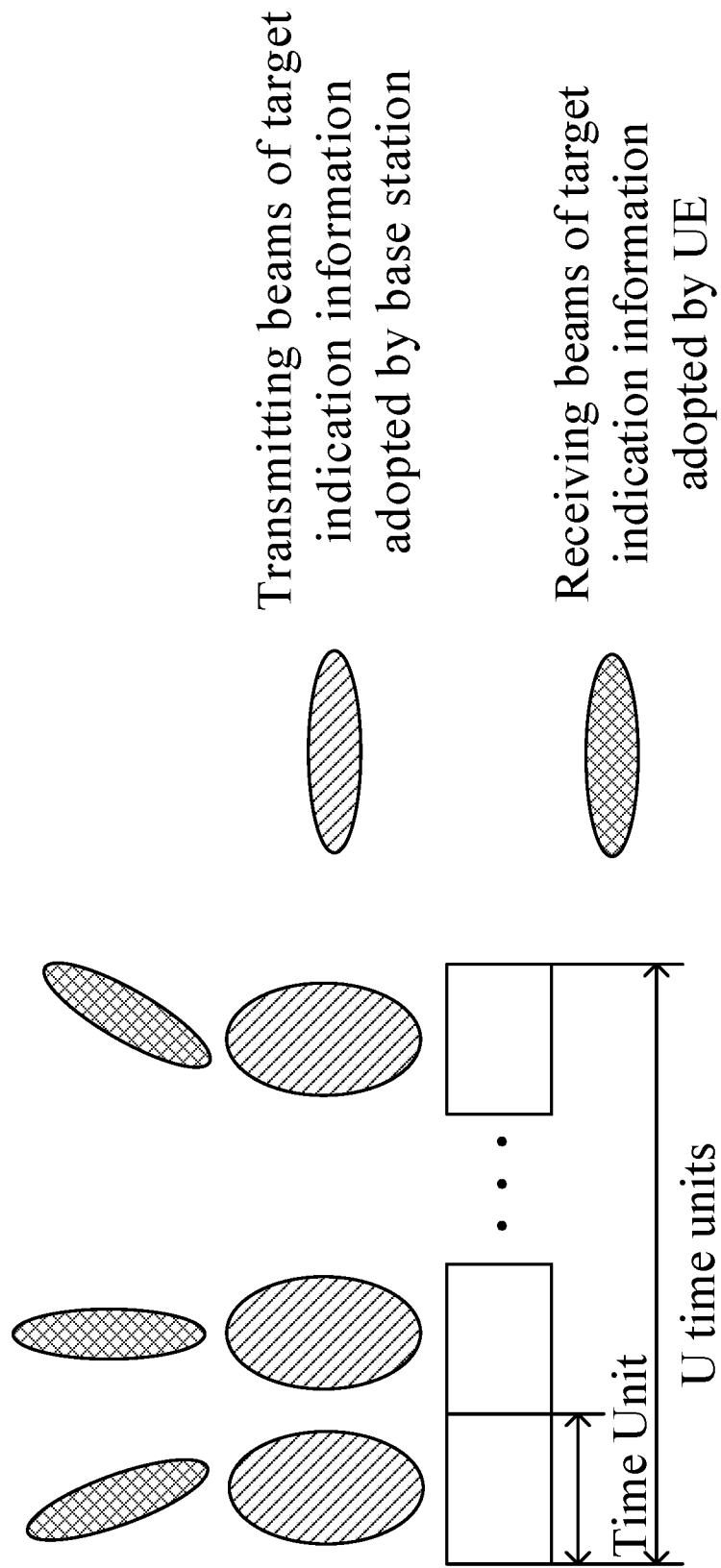
FIG. 17 illustrates a spatial schematic diagram of transmission of target indication information according to one embodiment of the present disclosure.

Embodiment 17 illustrates a spatial diagram of transmission of target indication information, as shown in FIG. 17. In FIG. 17, the given indication information group in the present disclosure comprises N piece(s) of indication information, and the target indication information is any of the N piece(s) of indication information; the given indication information group corresponds to a given time slice in Embodiment 16; the base station in the disclosure transmits the target indication information U time(s) in U time unit(s) of the given time slice, and the UE detects the target indication information in the U time units; the U is a positive integer.

In one subembodiment, the U is greater than 1.

In one subembodiment, the base station adopts the candidate antenna port group in Embodiment 16 to transmit the target indication information in each of the U time unit(s).

In one subembodiment, the base station adopts the same transmitting beamforming vector to transmit the target indication information in each of the U time unit(s).

In one subembodiment, the UE adopts U receiving beamforming vector(s) to receive the target indication information in the U time unit(s) respectively.

In one subsidiary embodiment of the subembodiment, the U receiving beamforming vector(s) corresponds(correspond) to U transmitting antenna port group(s) respectively.

In one subsidiary embodiment of the subembodiment, any of the U transmitting antenna port group(s) comprises a positive integer number of transmitting antenna port(s).

In one subsidiary embodiment of the subembodiment, the U transmitting antenna port group(s) is(are) respectively used to transmit U Sounding Reference Signal(s) (SRS).

In one subsidiary embodiment of the subembodiment, the U transmitting antenna port group(s) corresponds(correspond) to the configuration of U SRS(s) respectively.

In one subembodiment, the UE detects target indication information in a sweeping manner in the U time unit(s) respectively.

In one subembodiment, any time unit of the U time unit(s) comprises a positive integer number of multi-carrier symbol(s).

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) used for wireless communication, comprising:

receiving third information;

receiving Q1 indication information groups, which correspond to Q1 time slices respectively, the Q1 being a positive integer;

receiving Q2 reference signals respectively in Q2 time slices of a first frequency sub-band; and transmitting first information;

wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; the Q1 indication information groups, the Q2 reference signals and the first information are all transmitted through an air interface; and wherein a given reference signal is any reference signal among the Q2 reference signals, and the third information is used to determine at least the former between frequency domain resources occupied by the given reference signal and a period configured by the given reference signal; the third information is transmitted through an air interface.

2. The method according to claim 1, comprising:

receiving second information;

wherein the second information is used to determine a first index set, the first index set comprises a positive integer number of index(es), and the Q1 indication information groups are used to determine Q1 indexes respectively; Q2 indication information groups among the Q1 indication information groups correspond to the Q2 time slices one by one, and Q2 indexes corresponding to the Q2 indication information groups belong to the first index set; the second information is transmitted through an air interface.

3. The method according to claim 1, comprising:
receiving a first radio signal;
wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to antenna ports comprised in the Q2 antenna port groups; the UE receives the first radio signal in the candidate antenna port set; the M is a positive integer.

4. The method according to claim 1, wherein a given indication information group is any of the Q1 indication information groups, the given indication information group comprises N piece(s) of indication information, the N piece(s) of indication information respectively indicates (indicate) that N multi-carrier symbol group(s) is(are) occupied, and any of the N multi-carrier symbol group(s) comprises a positive integer number of multi-carrier symbol(s).

5. A method in a base station for wireless communications, comprising:
transmitting third information;
transmitting Q1 indication information groups, which corresponds to Q1 time slices respectively, the Q1 being a positive integer;
transmitting Q2 reference signals respectively in Q2 time slices of a first frequency sub-band; and
receiving first information;
herein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; the Q1 indication information groups, the Q2 reference signals and the first information are all transmitted through an air interface; and
wherein a given reference signal is any reference signal among the Q2 reference signals, and the third information is used to determine at least the former between frequency domain resources occupied by the given reference signal and a period configured by the given reference signal; the third information is transmitted through an air interface.

6. The method according to claim 5, comprising:
transmitting second information;
wherein the second information is used to determine a first index set, the first index set comprises a positive integer number of index(es), and the Q1 indication information groups are used to determine Q1 indexes respectively; Q2 indication information groups among the Q1 indication information groups correspond to the Q2 time slices one by one, and Q2 indexes corresponding to the Q2 indication information groups belong to the first index set; the second information is transmitted through an air interface.

7. The method according to claim 5, comprising:
transmitting a first radio signal;
wherein the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to antenna ports comprised in the Q2 antenna port groups; the base station transmits the first radio signal in the candidate antenna port set; the M is a positive integer.

8. The method according to claim 5, wherein a given indication information group is any of the Q1 indication information groups, the given indication information group comprises N piece(s) of indication information, the N piece(s) of indication information respectively indicates (indicate) that N multi-carrier symbol group(s) is(are) occupied, and any of the N multi-carrier symbol group(s) comprises a positive integer number of multi-carrier symbol(s).

9. A UE for wireless communications, comprising:
a first receiver, receiving Q1 indication information groups, which correspond to Q1 time slices respectively, the Q1 being a positive integer;
a second receiver, receiving Q2 reference signals respectively in Q2 time slices of the first frequency sub-band; and
a first transceiver, transmitting first information;
wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups are dynamically configured; the Q1 indication information groups, the Q2 reference signals and the first information are all transmitted through an air interface; and
wherein a first receiver receives the third information; wherein the given reference signal is any of the Q2 reference signals, and the third information is used to determine at least the former between frequency domain resources occupied by the given reference signal and a period configured by the given reference signal; the third information is transmitted through an air interface.

10. The UE according to claim 9, wherein the first receiver receives second information; the second information is used to determine a first index set, the first index set comprises a positive integer number of index(es), and the Q1 indication information groups are used to determine Q1 indexes respectively; Q2 indication information groups among the Q1 indication information groups correspond to the Q2 time slices, and Q2 indexes corresponding to the Q2 indication information groups belong to the first index set; the second information is transmitted through an air interface.

11. The UE according to claim 9, wherein the first transceiver receives a first radio signal; the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to antenna ports comprised in the Q2 antenna port groups; the UE receives the first radio signal in the candidate antenna port set; the M is a positive integer.

12. The UE according to claim 9, wherein a given indication information group is any of the Q1 indication information groups, the given indication information group comprises N piece(s) of indication information, the N piece(s) of indication information respectively indicates (indicate) that N multi-carrier symbol group(s) is(are) occupied, and any of the N multi-carrier symbol group(s) comprises a positive integer number of multi-carrier symbol(s).

13. A base station for wireless communications, comprising:
- a second transceiver, transmitting Q1 indication information groups, the Q1 indication information groups corresponding to Q1 time slices respectively, the Q1 being a positive integer;
- a first transmitter, transmitting Q2 reference signals respectively in Q2 time slices of a first frequency sub-band; and
- a third transceiver, receiving first information;
- wherein a channel measurement for the Q2 reference signals is used to generate the first information, and the channel measurement used to generate the first information is limited to the Q2 time slices of the Q1 time slices, and the Q2 is a positive integer not greater than the Q1; the Q1 indication information groups are used to determine the Q2 time slices, and at least one unoccupied multi-carrier symbol is comprised between any two adjacent time slices of the Q2 time slices; any of the Q1 indication information groups comprises a positive integer number of piece(s) of indication information, and all the indication information comprised in the Q1 indication information groups is dynamically configured; the Q1 indication information groups, the Q2 reference signals and the first information are all transmitted through an air interface; and
- wherein the second transceiver transmits third information; a given reference signal is any of the Q2 reference signals, and the third information is used to determine at least the former between frequency domain resources occupied by the given reference signal and a period configured by the given reference signal; the third information is transmitted through an air interface.

14. The base station according to claim 13, wherein the second transceiver transmits second information; the second information is used to determine a first index set, the first index set comprises a positive integer number of index(es), and the Q1 indication information groups are used to determine Q1 indexes respectively; Q2 indication information groups among the Q1 indication information groups correspond to the Q2 time slices one by one, and Q2 indexes corresponding to the Q2 indication information groups belong to the first index set; the second information is transmitted through an air interface.

15. The base station according to claim 13, wherein the third transceiver transmits a first radio signal; the Q2 reference signals are respectively transmitted by Q2 antenna port groups, and any of the Q2 antenna port groups comprises a positive integer number of antenna port(s); the first information is used to determine a candidate antenna port set, the candidate antenna port set comprises M candidate antenna port(s), and each of the M candidate antenna port(s) belongs to antenna ports comprised in the Q2 antenna port groups; the base station transmits the first radio signal in the candidate antenna port set; the M is a positive integer.

16. The base station according to claim 13, wherein a given indication information group is any of the Q1 indication information groups, the given indication information group comprises N piece(s) of indication information, the N piece(s) of indication information respectively indicates (indicate) that N multi-carrier symbol group(s) is(are) occupied, and any of the N multi-carrier symbol group(s) comprises a positive integer number of multi-carrier symbol(s).

* * * * *